US012781069B2

(12) United States Patent
Sato

(10) Patent No.: US 12,781,069 B2
(45) **Date of Patent: *Nov. 3, 2026**

(54) INKJET INK AND INKJET RECORDING APPARATUS

(71) Applicant: KYOCERA Document Solutions Inc., Osaka (JP)

(72) Inventor: Satoshi Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 442 days.

This patent is subject to a terminal disclaimer.

(21) Appl. No.: 18/520,150

(22) Filed: Nov. 27, 2023

(65) Prior Publication Data

US 2024/0191090 A1 Jun. 13, 2024

(30) Foreign Application Priority Data

Nov. 30, 2022 (JP) ................................ 2022-191468

(51) Int. Cl.

*C09D 11/107* (2014.01)
*C09B 48/00* (2006.01)
*C09B 67/20* (2006.01)
*C09D 11/037* (2014.01)
*C09D 11/322* (2014.01)

(52) U.S. Cl.

CPC ............ *C09D 11/107* (2013.01); *C09B 48/00* (2013.01); *C09B 67/0069* (2013.01); *C09D 11/037* (2013.01); *C09D 11/322* (2013.01)

(58) Field of Classification Search

None

See application file for complete search history.

(56) References Cited

U.S. PATENT DOCUMENTS 12,384,929 B2 * 8/2025 Yoshii .................. C09D 11/322
2025/0026943 A1 * 1/2025 Sato ..................... C09D 11/107

FOREIGN PATENT DOCUMENTS

JP 2000-273383 A 10/2000

* cited by examiner

*Primary Examiner* — Stefanie J Cohen
(74) *Attorney, Agent, or Firm* — Stein IP, LLC

(57) ABSTRACT

An inkjet ink contains quinacridone pigment, pigment dispersion resin, and aqueous medium. The pigment dispersion resin contains absorbed resin that is absorbed by the quinacridone pigment and unabsorbed resin that is not absorbed by the quinacridone pigment. A ratio of the unabsorbed resin to the pigment dispersion resin is 50 weight percent or less. A sulfur concentration in the 10-fold diluent of supernatant liquid obtained by centrifuging the inkjet ink at 1,050,000 G for three hours is 0.4 ppm or more and 7.0 ppm or less. In an ultraviolet and visible ray absorption spectrum of the 25-fold diluent of the supernatant liquid, light absorbance at a predetermined peak is 0.7 or less. The predetermined peak is a maximum peak in a wavelength range of 400 nm or more and 490 nm or less.

12 Claims, 5 Drawing Sheets

INKJET INK AND INKJET RECORDING APPARATUS

INCORPORATION BY REFERENCE

This application is based upon and claims the benefit of priority from the corresponding Japanese Patent Application No. 2022-191468 filed Nov. 30, 2022, the entire contents of which are hereby incorporated by reference.

BACKGROUND

The present disclosure relates to an inkjet ink and an inkjet recording apparatus.

The inkjet recording apparatus is equipped with a recording head, which ejects inkjet ink. The inkjet ink is required to have ejection stability from the recording head.

SUMMARY

The inkjet ink according to the present disclosure contains quinacridone pigment, pigment dispersion resin, and aqueous medium. The pigment dispersion resin contains absorbed resin that is absorbed by the quinacridone pigment and unabsorbed resin that is not absorbed by the quinacridone pigment. A ratio of the unabsorbed resin to the pigment dispersion resin is 50 weight percent or less. A sulfur concentration of the 10-fold diluent of supernatant liquid obtained by centrifuging the inkjet ink at 1,050,000 G for three hours is 0.4 ppm or more and 7.0 ppm or less. In an ultraviolet and visible ray absorption spectrum of 25-fold diluent of the supernatant liquid, light absorbance at a predetermined peak is 0.7 or less. The predetermined peak is a maximum peak in a wavelength range of 400 nm or more and 490 nm or less.

Other objects of the present disclosure and specific advantages obtained by the present disclosure will become more apparent from the description of the embodiment given below.

DETAILED DESCRIPTION

Figure 1:
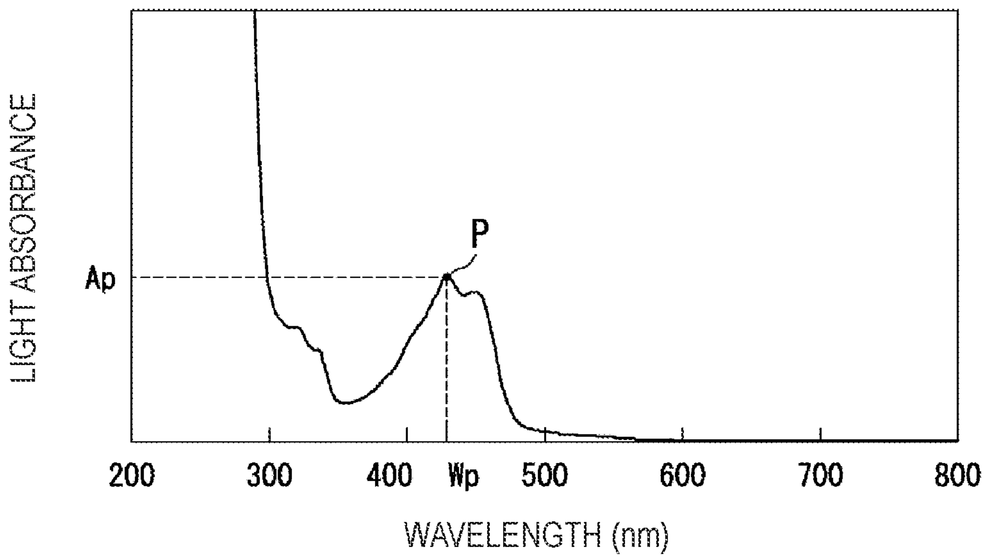
FIG. 1 is a diagram illustrating an example of an ultraviolet and visible ray absorption spectrum of 25-fold diluent of supernatant liquid.

Hereinafter, an embodiment of the present disclosure is described. First, terms used in this specification is explained. A volume median diameter ($D_{50}$) is a value measured by a dynamic light scattering type particle size distribution analyzer (Zetasizer Nano ZS manufactured by Spectris Co., Ltd.) unless otherwise noted. An acid number is a value measured according to "JIS (Japanese Industrial Standard) K0070:1992" unless otherwise noted. A mass average molecular weight (Mw) is a value measured using a gel permeation chromatography unless otherwise noted. In this specification, "acryl" and "methacryl" may be generically referred to as "(meth)acryl". In description of formula, "each independently" means it may represent the same group or may represent different groups. Components described in this specification may be one type used alone or may be two or more types used in combination. Thus, the terms used in this specification are described above.

Next, an example of conventional art and a problem thereof are described. As an example of conventional art, there is inkjet recording liquid containing an aqueous pigment dispersing element. This aqueous pigment dispersing element contains aqueous liquid, quinacridone pigment particles dispersed in the aqueous liquid, water-soluble quinacridone derivative absorbed on surfaces of the quinacridone pigment particles, and unabsorbed water-soluble quinacridone derivative. However, this conventional inkjet recording liquid is insufficient for suppressing occurrence of ejection displacement from a recording head of the inkjet recording apparatus, and for dispersion stability.

The present disclosure is made in view of the problem described above, and its object is to provide inkjet ink that can suppress occurrence of ejection displacement from the recording head and has good dispersion stability, and to provide an inkjet recording apparatus using the inkjet ink.

First Embodiment: Inkjet Ink

Hereinafter, inkjet ink of a first embodiment of the present disclosure (hereinafter, may be referred to simply as ink) is described.

The ink of the first embodiment contains quinacridone pigment, pigment dispersion resin, and aqueous medium. The pigment dispersion resin contains absorbed resin that is absorbed by the quinacridone pigment and unabsorbed resin that is not absorbed by the quinacridone pigment. A ratio of the unabsorbed resin to the pigment dispersion resin is 50 weight percent or less. A sulfur concentration of the 10-fold diluent of supernatant liquid obtained by centrifuging the ink at 1,050,000 G for three hours is 0.4 ppm or more and 7.0 ppm or less. In an ultraviolet and visible ray absorption spectrum of 25-fold diluent of the supernatant liquid obtained by centrifuging the ink at 1,050,000 G for three hours, light absorbance at a predetermined peak is 0.7 or less. The predetermined peak is a maximum peak in a wavelength range of 400 nm or more and 490 nm or less.

Hereinafter, the "ratio of the unabsorbed resin to the pigment dispersion resin" may be referred to as an "unabsorbed resin ratio". In addition, the "supernatant liquid obtained by centrifuging the ink at 1,050,000 G for three hours" may be referred to simply as "supernatant liquid". In addition, the "sulfur concentration of the 10-fold diluent of supernatant liquid obtained by centrifuging the ink at 1,050,000 G for three hours" may be referred to simply as a "predetermined sulfur concentration". The "light absorbance at the predetermined peak in the ultraviolet and visible ray absorption spectrum of 25-fold diluent of the supernatant liquid obtained by centrifuging the ink at 1,050,000 G for three hours" may be referred to as a "predetermined light absorbance". In this specification, the "predetermined peak" is defined as a "maximum peak in a wavelength range of 400 nm or more and 490 nm or less in the ultraviolet and visible ray absorption spectrum".

The ink of the first embodiment, which has the structure described above, can suppress occurrence of ejection displacement of ink from the recording head, and has good dispersion stability. The reason is considered as follows.

First, to assist understanding, a general outline of a method for synthesizing quinacridone pigment is described. The quinacridone pigment is a compound expressed by formula (D), for example. The quinacridone pigment is synthesized by carrying out the reactions expressed by the reaction formulas (r-a), (r-b), and (r-c), for example.

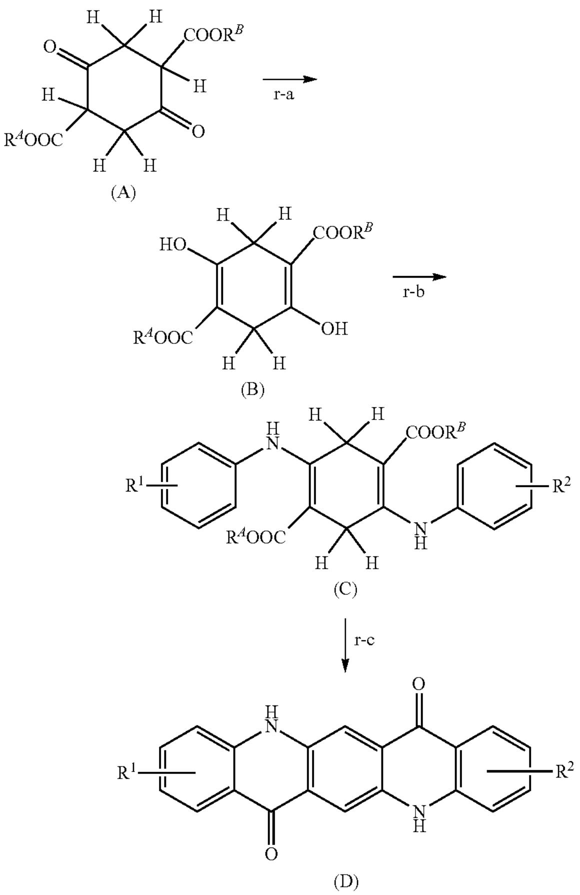

(A) (B) (C) (D)

$R^A$, $R^B$, $R^1$, and $R^2$ in formulas (A), (B), (C), and (D) each independently represent a monovalent group. Hereinafter, the "reactions expressed by the reaction formulas (r-a), (r-b), and (r-c)" may be referred to as "reactions (r-a), (r-b), and (r-c)", respectively. In addition, the "compounds expressed by formulas (A), (B), (C), and (D)" may be referred to as "compounds (A), (B), (C), and (D)", respectively. If $R^1$ and $R^2$ each represent a methyl group, the compound (D) is C.I. Pigment Red 122. If $R^1$ and $R^2$ each represent a hydrogen atom, the compound (D) is C.I. Pigment Violet 19. In the process of carrying out the reactions (r-a), (r-b), and (r-c), compounds (B) and (C) as synthetic intermediates are generated. Thus, the general outline of the method for synthesizing the quinacridone pigment is described above.

The synthetic intermediates of the quinacridone pigment generated in the process of carrying out the reactions (r-a), (r-b), and (r-c) (more specifically, the compounds (B) and (C)) may remain as impurities in the quinacridone pigment. When this quinacridone pigment is contained in the ink, the ink also contains the synthetic intermediates. The polarity of the synthetic intermediate is relatively high. Therefore, if the ink containing the quinacridone pigment is used for forming an image, the synthetic intermediates may be electrostatically adhered to an ejection face and a nozzle hole inner wall of the recording head. When the ink is dried and thickened, the adhered synthetic intermediates become an aggregation, which causes the ejection displacement of ink from the recording head. Therefore, in the ink of the first embodiment, the predetermined light absorbance is set to 0.7 or less. The predetermined peak is a peak derived from the synthetic intermediates of the quinacridone pigment (more specifically, compounds (B) and (C)), for example. If the predetermined light absorbance is 0.7 or less, there are relatively little synthetic intermediates as impurities, and hence occurrence of the ejection displacement of ink from the recording head can be suppressed.

In addition, the quinacridone pigment is hardly dispersed in an aqueous medium, and hence the pigment dispersion resin may be added to the ink. The pigment dispersion resin contains absorbed resin that is absorbed by the quinacridone pigment and unabsorbed resin that is not absorbed by the quinacridone pigment. The absorbed resin allows the quinacridone pigment to be dispersed in the aqueous medium. On the other hand, the unabsorbed resin is free in the aqueous medium, for example. Polarity of the unabsorbed resin is relatively high. Therefore, if the ink containing the unabsorbed resin is used to form an image, the unabsorbed resin may be electrostatically adhered to the ejection face or the nozzle hole inner wall of the recording head. When the ink is dried and thickened, the adhered unabsorbed resin becomes an aggregation, which causes the ejection displacement of ink from the recording head. Therefore, in the ink of the first embodiment, the unabsorbed resin ratio is set to 50 weight percent or less. If the unabsorbed resin ratio is 50 weight percent or less, there is relatively little unabsorbed resin, and hence occurrence of the ejection displacement of ink from the recording head can be suppressed.

In addition, the quinacridone pigment is hardly dispersed in an aqueous medium, and hence quinacridone derivative containing sulfur atoms as a dispersing agent may be added to the quinacridone pigment. Hereinafter, "quinacridone derivative containing sulfur atoms" may be referred to as "sulfur containing pigment derivative". When the quinacridone pigment to which the sulfur containing pigment derivative is added is contained in the ink, the ink also contains the sulfur containing pigment derivative. Polarity of the sulfur containing pigment derivative is relatively high. Therefore, when the ink containing the quinacridone pigment is used to form an image, the sulfur containing pigment derivative may be electrostatically adhered to the ejection face or the nozzle hole inner wall of the recording head. When the ink is dried and thickened, the adhered sulfur containing pigment derivative becomes an aggregation, which causes the ejection displacement of ink from the recording head. Therefore, in the ink of the first embodiment, the predetermined sulfur concentration is set to 7.0 ppm or less. If the predetermined sulfur concentration is 7.0 ppm or less, there is relatively little sulfur containing pigment derivative, and hence occurrence of the ejection displacement of ink from the recording head can be suppressed.

In addition, in the ink of the first embodiment, the predetermined sulfur concentration is set to 0.4 ppm or more. The ink, in which the predetermined sulfur concentration is 0.4 ppm or more, contains sufficient amount of the sulfur containing pigment derivative as the dispersing agent. Therefore, the dispersed particle size of the pigment particles containing the quinacridone pigment becomes small, and the pigment particles are hardly precipitated. As a result, the dispersion stability of the ink is improved.

Thus, the reason why the ink of the first embodiment can suppress occurrence of the ejection displacement of ink from the recording head and can have good dispersion stability is described above. Hereinafter, the ink of the first embodiment is further described in detail.

Predetermined Light Absorbance

Hereinafter, with reference to FIG. 1, a method of determining the predetermined light absorbance is described. FIG. 1 is a diagram illustrating the ultraviolet and visible ray absorption spectrum of the 25-fold diluent obtained by diluting the supernatant liquid, which is obtained by centrifuging reference ink at 1,050,000 G for three hours, by 25 times with water. Note that the reference ink is different from ink of Example and Comparative Example, which are described later, and is shown as an example for describing the method of determining the predetermined light absorbance. This reference ink contains at least the quinacridone pigment (more specifically, C.I. Pigment Red 122), sulfur containing pigment derivative (1-1) described later, and aqueous medium. In FIG. 1, the vertical axis indicates the light absorbance, and the horizontal axis indicates the wavelength (nm).

In FIG. 1, the predetermined peak P is a maximum peak in the wavelength range of 400 nm or more and 490 nm or less. The maximum peak is a peak having a maximum light absorbance among peaks (i.e., apexes) of convex curves of the spectrum in the wavelength range of 400 nm or more and 490 nm or less.

In the spectrum illustrated in FIG. 1, the predetermined peak P having the maximum light absorbance is determined among peaks in the wavelength range of 400 nm or more and 490 nm or less. Then, from the spectrum illustrated in FIG. 1, wavelength Wp (unit: nm) and light absorbance Ap at the predetermined peak P of the 25-fold diluent of the supernatant liquid are read. The read light absorbance Ap at the predetermined peak P of the 25-fold diluent of the supernatant liquid is the light absorbance at the predetermined peak in the ultraviolet and visible ray absorption spectrum of the 25-fold diluent of the supernatant liquid (i.e., the predetermined light absorbance). Note that in the example illustrated in FIG. 1, among peaks of the spectrum in the wavelength range of 400 nm or more and 490 nm or less, the wavelength Wp at the predetermined peak P having the maximum light absorbance is identified to be 429 nm.

Thus, with reference to FIG. 1, the method of determining the predetermined light absorbance is described above. Hereinafter, the predetermined light absorbance is further described.

As already described above, the predetermined light absorbance is 0.7 or less. In order to suppress the ejection displacement of ink from the recording head, it is preferred that the predetermined light absorbance be 0.6 or less. In order to improve resolubility of ink, the predetermined light absorbance is preferably 0.1 or more, and more preferably 0.2 or more, and still more preferably 0.3 or more, and still more preferably 0.5 or more.

The predetermined peak is, for example, a peak derived from the synthetic intermediates of the quinacridone pigment remaining in the quinacridone pigment. Therefore, the predetermined light absorbance can be adjusted, for example, by changing amount of the synthetic intermediates remaining in the quinacridone pigment contained in the ink. The amount of the synthetic intermediates can be changed, for example, by changing the number of pass times of activated carbon treatment of the pigment dispersion liquid in a removal process described later. There is a tendency that the predetermined light absorbance becomes smaller, as the number of pass times of activated carbon treatment of the pigment dispersion liquid is larger, so that the synthetic intermediates are removed at least partially.

As the synthetic intermediates of the quinacridone pigment for synthesizing the quinacridone pigment, there is, for example, the compound expressed by formula (2) (hereinafter, may be referred to as compound (2)). The predetermined peak is, for example, a peak derived from the compound (2) contained in the ink.

(2)

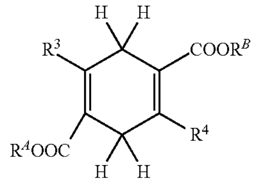

In the formula (2), $R^A$ and $R^B$ each independently represent a monovalent group. $R^3$ represents a hydroxy group or the group expressed by formula (3). $R^4$ represents a hydroxy group or the group expressed by formula (4).

(3)

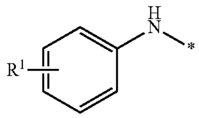

(4)

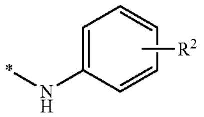

In the formulas (3) and (4), $R^1$ and $R^2$ each independently represent a monovalent group. The symbol * in the formula (3) represents that it is bonded to a carbon atom to which $R^3$ in the formula (2) is bonded. The symbol * in the formula (4) represents that it is bonded to a carbon atom to which $R^4$ in the formula (2) is bonded.

As the compound (2), there are, for example, the compounds (B) and (C) that are already described.

As the monovalent groups represented by $R^A$ and $R^B$ in the formula (2), and formulas (A), (B), and (C) that are already described, there are, for example, an alkyl group and an aryl group. The monovalent groups represented by $R^A$ and $R^B$ are each preferably an alkyl group, and more preferably an alkyl group having a number of carbon atoms of 1 or more and 6 or less, and still more preferably an ethyl group.

As the monovalent groups represented by $R^1$ and $R^2$ in the formulas (3) and (4), and formulas (C), and (D) that are already described, there are, for example, a hydrogen atom, an alkyl group, and a halogen atom. The halogen atoms represented by $R^1$ and $R^2$ are each preferably a chlorine atom. The alkyl groups represented by $R^1$ and $R^2$ are each preferably an alkyl group having a number of carbon atoms of 1 or more and 6 or less, and more preferably a methyl group. $R^1$ and $R^2$ each preferably represent a hydrogen atom. In addition, it is also preferred that $R^1$ and $R^2$ each represent a methyl group.

Quinacridone Pigment

The ink contains quinacridone pigment. As the quinacridone pigment, there are, for example, C.I. Pigment Violet (19 and 42), C.I. Pigment Red (122, 202, 206, 207, and 209), and C.I. Pigment orange (48 and 49). As a crystal form of the quinacridone pigment, there are, for example, an α-type, a γ-type, and a β-type. For stabilization of crystal of quinacridone pigment, the quinacridone pigment preferably has a γ-type crystal or a β-type crystal. The quinacridone pigment does not need to have sulfur atoms unlike the sulfur containing pigment derivative.

As the quinacridone pigment usable and available on the market, for example, there are "RED63" produced by Dainichiseika Color & Chemicals Mfg. Co., Ltd., "TRM-11" produced by Dainichiseika Color & Chemicals Mfg. Co., Ltd., "Cinquasia (registered trademark) Magenta D4550" produced by BASF Company, "Cinquasia (registered trademark) Pink D4450" produced by BASF Company, "Inkjet Magenta E-S" produced by Clariant AG, "HOSTAPERM PINK E 02" produced by Clariant AG, "HOSTAPERM RED E3B" produced by Clariant AG, and "HOSTAPERM RED E5B 02" produced by Clariant AG.

As the predetermined sulfur concentration can be easily adjusted within a predetermined range, the content percentage of the quinacridone pigment with respect to the total weight of the quinacridone pigment and the sulfur containing pigment derivative is preferably 92.0 weight percent or more and 97.0 weight percent or less, and more preferably 92.0 weight percent or more and 93.0 weight percent or less.

The content percentage of the quinacridone pigment in the ink is preferably 1 weight percent or more and 12 weight percent or less, and more preferably 4 weight percent or more and 8 weight percent or less. By setting the content percentage of the quinacridone pigment to be 1 weight percent or more, an image having a desired image density can be formed using the ink. By setting the content percentage of the quinacridone pigment to be 12 weight percent or less, flowability of the ink can be optimized. The ink may contain only the quinacridone pigment as the pigments. Alternatively, in order to adjust the hue of the ink, the ink may further contain, in addition to the quinacridone pigment, other pigment, as the pigments. The content percentage of the quinacridone pigment in the pigments is preferably 80 weight percent or more, and more preferably 90 weight percent or more, and particularly preferably 100 weight percent. The total content percentage of the quinacridone pigment and the sulfur containing pigment derivative in the ink is preferably 1 weight percent or more and 12 weight percent or less, and more preferably 4 weight percent or more and 8 weight percent or less.

Sulfur Containing Pigment Derivative

It is preferred that the ink further contain the sulfur containing pigment derivative (i.e., the quinacridone derivative containing sulfur atoms). The sulfur containing pigment derivative is at least partially absorbed by the quinacridone pigment. The quinacridone pigment is hydrophobic, and the sulfur containing pigment derivative is hydrophilic. Therefore, when the sulfur containing pigment derivative is absorbed by the quinacridone pigment, the quinacridone pigment is properly dispersed in the aqueous medium. It is preferred that the quinacridone pigment be water-insoluble and that the sulfur containing pigment derivative be water-soluble. The sulfur containing pigment derivative may be partially free in the aqueous medium.

The predetermined sulfur concentration corresponds to concentration of sulfur atoms of the sulfur containing pigment derivative in the 10-fold diluent of the supernatant liquid. In other words, the predetermined sulfur concentration is the concentration of sulfur atoms of the sulfur containing pigment derivative contained in the 10-fold diluent of the supernatant liquid. The 10-fold diluent of the supernatant liquid is diluent of the supernatant liquid diluted by 10 times with water. The predetermined sulfur concentration is derived from, for example, sulfur atoms of the sulfur containing pigment derivative contained in the ink.

As already described above, the predetermined sulfur concentration is 0.4 ppm or more and 7.0 ppm or less. In order to allow the quinacridone pigment to be further properly dispersed in the aqueous medium and to improve resolubility of the ink, the predetermined sulfur concentration is preferably 1.5 ppm or more, and more preferably 2.0 ppm or more, and still more preferably 3.0 ppm or more, and still more preferably 5.0 ppm or more. In this specification, the resolubility of ink means characteristics of dried ink adhered and dried on the ejection face of the recording head to be easily dissolved by at least one of the cleaning liquid and purge ink. On the other hand, in order to further suppress occurrence of the ejection displacement of ink from the recording head, the predetermined sulfur concentration is preferably 5.0 ppm or less, and more preferably 3.0 ppm or less, and still more preferably 2.0 ppm or less, and still more preferably 1.5 ppm or less.

For instance, by changing the content percentage of the sulfur containing pigment derivative with respect to the total weight of the quinacridone pigment and the sulfur containing pigment derivative, the predetermined sulfur concentration can be adjusted. There is a tendency that the predetermined sulfur concentration is smaller as the content percentage of the sulfur containing pigment derivative is smaller. For instance, in the process A and the process B described later for synthesizing the quinacridone pigment, by changing amount of the sulfur containing pigment derivative to be added, the predetermined sulfur concentration can be adjusted. When using commercially available quinacridone pigment, by selecting a production lot having the desired content percentage of the sulfur containing pigment derivative, the predetermined sulfur concentration can be adjusted. In addition, by changing the number of pass times of activated carbon treatment of the pigment dispersion liquid in the removal process described later, the predetermined sulfur concentration can be adjusted. There is a tendency that the predetermined sulfur concentration becomes smaller as the number of pass times of activated carbon treatment of the pigment dispersion liquid is larger, so that the sulfur containing pigment derivative is removed at least partially. For instance, the predetermined sulfur concentration is measured by the method described in Example.

The sulfur containing pigment derivative has a sulfur-containing group, for example. As the sulfur-containing group, there are, for example, a sulfo group, a sulfino group, a sulfeno group, a thiocarboxyl group, a dithiocarboxy group, and a sulfide group. The sulfur containing pigment derivative is a compound in which a hydrogen atom of the quinacridone pigment exemplified in the above description is replaced by the sulfur-containing group, for example.

The sulfur containing pigment derivative is preferably a metallic salt. If the sulfur containing pigment derivative is a metallic salt, compatibility of the sulfur containing pigment derivative with the aqueous medium is enhanced. As a result, the quinacridone pigment that has absorbed the sulfur containing pigment derivative is properly dispersed in the aqueous medium. The sulfur containing pigment derivative as the metallic salt is preferably the compound expressed by the formula (1) (hereinafter, may be referred to as a sulfur containing pigment derivative (1)).

(1)

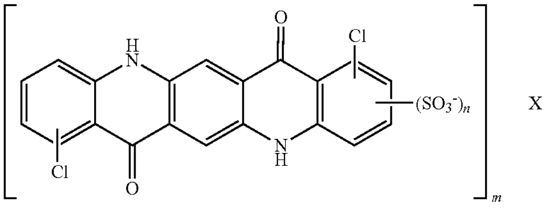

In the formula (1), n represents an integer of 1 or more and 3 or less, m represents an integer of 1 or more and 3 or less, X represents a metallic ion. The metallic ion is a metal cation, for example.

In the formula (1), n preferably represents 2 or 3. It is preferred that m represents 1. In the formula (1), X preferably represents one or more and three or less valent metallic ion, and more preferably bivalent or trivalent metallic ion, and still more preferably $Al^{3+}$ or $Mg^{2+}$.

As the sulfur containing pigment derivative (1), there are, for example, compounds expressed by formulas (1-1) and (1-2) (hereinafter, may be referred to as sulfur containing pigment derivatives (1-1) and (1-2), respectively). Note that in the formulas (1-1) and (1-2), m represents 1 but is omitted.

(1-1)

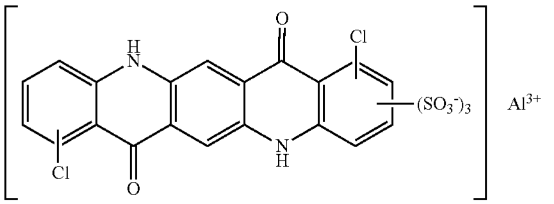

(1-2)

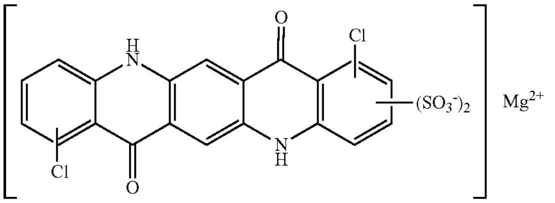

The content percentage of the sulfur containing pigment derivative with respect to the total weight of the quinacridone pigment and the sulfur containing pigment derivative is preferably 3.0 weight percent or more and 8.0 weight percent or less, and more preferably 7.0 weight percent or more and 8.0 weight percent or less. If the content percentage of the sulfur containing pigment derivative is 3.0 weight percent or more and 8.0 weight percent or less, the predetermined sulfur concentration can be easily adjusted within a predetermined range. There is a tendency that the predetermined sulfur concentration becomes lower as the content percentage of the sulfur containing pigment derivative becomes lower.

The content percentage of the sulfur containing pigment derivative in the ink is preferably 0.01 weight percent or more and 2.00 weight percent or less, and more preferably 0.20 weight percent or more and 0.75 weight percent or less.

Pigment Dispersion Resin

The ink contains the pigment dispersion resin. The pigment dispersion resin contains the absorbed resin and the unabsorbed resin. The absorbed resin is absorbed by the quinacridone pigment. The quinacridone pigment forms the pigment particles together with the absorbed resin, for example. For instance, the pigment particle has a core containing the quinacridone pigment and a covering layer that covers the core. The covering layer is formed of the absorbed resin. The pigment dispersion resin is hydrophilic, and hence the absorbed resin absorbed on surfaces of the quinacridone pigment allows the quinacridone pigment to be dispersed in the aqueous medium. On the other hand, the unabsorbed resin is not absorbed in the quinacridone pigment. The unabsorbed resin is free in the aqueous medium.

As already described above, the unabsorbed resin ratio is 50 weight percent or less. In order to further suppress occurrence of the ejection displacement of ink from the recording head, the unabsorbed resin ratio is preferably 45 weight percent or less, and more preferably 40 weight percent or less, and still more preferably 30 weight percent or less. In order to improve dispersion stability of the ink, the unabsorbed resin ratio is preferably 10 weight percent or more, and more preferably 20 weight percent or more.

The unabsorbed resin ratio can be measured by centrifuging the ink using a centrifugal separator. The unabsorbed resin ratio can be calculated by the calculating formula "unabsorbed resin ratio=100×weight of unabsorbed resin/total weight of pigment dispersion resin=100×weight of unabsorbed resin/(weight of unabsorbed resin+weight of absorbed resin)". For instance, in the preparation process of the pigment dispersion liquid described later, there is a tendency that the unabsorbed resin ratio becomes higher as a discharge rate of a wet disperser is larger.

In order to further suppress occurrence of the ejection displacement of ink from the recording head and to allow the quinacridone pigment to be properly dispersed in the aqueous medium, a weight ratio of the pigment dispersion resin with respect to the quinacridone pigment (hereinafter, may be referred to as a "resin/pigment ratio") is preferably 0.50 or less, and more preferably 0.35 or more and 0.50 or less. The resin/pigment ratio can be calculated by the calculating formula "resin/pigment ratio=weight of pigment dispersion resin/weight of pigment". The weight of the pigment dispersion resin is the total weight of the absorbed resin and the unabsorbed resin.

In order to further suppress occurrence of the ejection displacement of ink from the recording head, the acid number of the pigment dispersion resin is preferably 60 mgKOH/g or more and 300 mgKOH/g or less, and preferably 80 mgKOH/g or more and 120 mgKOH/g or less, and more preferably 90 mgKOH/g or more and 110 mgKOH/g or less. In addition, if the acid number of the pigment dispersion resin is 60 mgKOH/g or more, the pigment particles are properly dispersed in the aqueous medium, and it is possible to form an image having good color development and good tinting power. On the other hand, if the acid number of the pigment dispersion resin is 300 mgKOH/g or less, the ink can be stably conserved.

In order to optimize viscosity of the ink, the mass average molecular weight of the pigment dispersion resin is preferably 10,000 or more and 50,000 or less, and more preferably 15,000 or more and 30,000 or less.

As the pigment dispersion resin, there are, for example, acrylic resin, styrene acrylic resin, styrene maleic acid resin, and polyurethane resin. In view of allowing the quinacridone pigment to be stably dispersed, the pigment dispersion resin is preferably styrene acrylic resin.

The styrene acrylic resin contains, as repeating units, at least a repeating unit derived from styrene or its derivative, and a repeating unit derived from (meth)acryl acid. The styrene acrylic resin preferably further contains, as repeating units, a repeating unit derived from (meth)acryl acid ester.

As a first monomer that can form the repeating unit derived from styrene or its derivative, there are, for example, styrene, a-methyl styrene, and vinyl toluene. The first monomer is preferably styrene. The content percentage of the repeating unit derived from styrene or its derivative with respect to all repeating units of the resin is preferably 25.0 weight percent or more and 60.0 weight percent or less.

As a second monomer that can form the repeating unit derived from (meth)acryl acid, there are, for example, acryl acid, and methacryl acid. The second monomer is preferably methacryl acid. Among all repeating units of the pigment dispersion resin, the content percentage of the repeating unit derived from (meth)acryl acid is preferably 4.5 weight percent or more and 10.0 weight percent or less.

As a third monomer that can form the repeating unit derived from (meth)acryl acid ester, there is, for example, (meth)acryl acid alkyl ester. The (meth)acryl acid alkyl ester is preferably (meth)acryl acid alkyl ester having 1 or more and 8 or less carbon atoms in the alkyl group, and more preferably (meth)acryl acid alkyl ester having 1 or more and 4 or less carbon atoms in the alkyl group, and still more preferably (meth)acryl acid methyl and (meth)acryl acid butyl, and particularly preferably methacryl acid methyl and acryl acid butyl. Among all repeating units of the pigment dispersion resin, the content percentage of the repeating unit derived from (meth)acryl acid ester is preferably 35.0 weight percent or more and 70.0 weight percent or less, and more preferably 50.0 weight percent or more and 70.0 weight percent or less. If the pigment dispersion resin has repeating units derived from two or more types of (meth)acryl acid ester, the content percentage of the repeating unit derived from (meth)acryl acid ester is the total content percentage of the repeating units derived from two or more types of (meth)acryl acid ester.

The pigment dispersion resin is preferably a resin having a repeating unit derived from at least one type of (meth)acryl acid, a repeating unit derived from at least one type of (meth)acryl acid alkyl ester, and a repeating unit derived from styrene. The pigment dispersion resin is more preferably a resin having a repeating unit derived from (meth)acryl acid, a repeating unit derived from (meth)acryl acid methyl, a repeating unit derived from (meth)acryl acid butyl, and a repeating unit derived from styrene. The pigment dispersion resin is still more preferably a resin having a repeating unit derived from methacryl acid, a repeating unit derived from methacryl acid methyl, a repeating unit derived from acryl acid butyl, and a repeating unit derived from styrene. The pigment dispersion resin may have, as the repeating units, only these repeating units, or may further have other repeating unit than these repeating units. In the pigment dispersion resin, the content percentage of these repeating units with respect to all repeating units of the pigment dispersion resin is preferably has 80 weight percent or more, and more preferably 90 weight percent or more, and is particularly preferably 100 weight percent.

The content percentage of the pigment dispersion resin in the ink is preferably 0.5 weight percent or more and 8.0 weight percent or less, and is more preferably 1.5 weight percent or more and 4.0 weight percent or less. By setting the content percentage of the pigment dispersion resin to 0.5 weight percent or more, aggregation of the quinacridone pigment can be appropriately suppressed. By setting the content percentage of the pigment dispersion resin to 8.0 weight percent or less, occurrence of nozzle clogging of the recording head can be appropriately suppressed.

Aqueous Medium

The ink contains aqueous medium. The aqueous medium is a medium containing water. The aqueous medium may function as a solvent, and may be function as a dispersion medium. As an example of the aqueous medium, there is a medium containing water and organic solvent. In order to enhance compatibility with water, the organic solvent contained in the aqueous medium is preferably water-soluble organic solvent. The water-soluble organic solvent is an organic solvent that is uniformly miscible with water at any ratio.

As the water-soluble organic solvent, there are, for example, a glycol compound, a triol compound, a glycol ether compound, a lactam compound, a nitrogen-containing compound, an acetate compound, γ-butyrolactone, thiodiglycol, and dimethyl sulfoxide.

As the glycol compound, there are, for example, ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. The glycol compound is preferably 3-methyl-1,5-pentanediol.

As the triol compound, there are, for example, glycerin, 1,2,3-butanetriol, and 1,2,6-hexanetriol. The triol compound is preferably glycerin.

As the glycol ether compound, there are, for example, diethylene glycol diethylether, diethylene glycol monoethylether, diethylene glycol monobutyl ether, ethylene glycol monomethyl ether, ethylene glycol monobutyl ether, diethylene glycol monomethyl ether, diethylene glycol monoethylether, diethylene glycol diethylether, triethylene glycol monomethyl ether, triethylene glycol monoethylether, triethylene glycol monobutyl ether, and propylene glycol monomethyl ether. The glycol ether compound is preferably triethylene glycol monobutyl ether.

As the lactam compound, there are, for example, 2-pyrrolidone, and N-methyl-2-pyrrolidone.

As the nitrogen-containing compound, there are, for example, 1,3-dimethyl imidazolidinone, formamide, and dimethyl formamide.

As the acetate compound, there is diethylene glycol monoethylether acetate, for example.

The aqueous medium is preferably a mixed solvent of water, triethylene glycol monobutyl ether, 3-methyl-1,5-pentanediol, and glycerin.

The content percentage of the water-soluble organic solvent in the ink is preferably 10 weight percent or more and 40 weight percent or less, and more preferably 20 weight percent or more and 30 weight percent or less. The content percentage of the aqueous medium in the ink is preferably 30 weight percent or more and 95 weight percent or less, and more preferably 70 weight percent or more and 95 weight percent or less.

Surface Acting Agent

The ink preferably further contains a surface acting agent. The surface acting agent optimizes compatibility and dispersion stability of components of the ink. In addition, the surface acting agent optimizes permeability of the ink to a recording medium. The surface acting agent is preferably a non-ionic surface acting agent.

As the non-ionic surface acting agent, there are, for example, acetylene diol and an ethylene oxide adduct of acetylene diol. As the acetylene diol, there are, for example, 2,4,7,9-tetramethyl-5-decyn-4,7-diol, 3,6-dimethyl-4-octyne-3,6-diol, 3,5-dimethyl-1-hexyne-3-ol, and 2,4-dimethyl-5-hexyne-3-ol. The non-ionic surface acting agent is preferably an ethylene oxide adduct of acetylene diol, and an ethylene oxide adduct of acetylene glycol. An HLB value of the non-ionic surface acting agent is preferably 4 or more and 14 or less, and more preferably 4 or more and 8 or less, or 10 or more and 14 or less. If the ink contains the surface acting agent, the content percentage of the surface acting agent in the ink is preferably 0.01 weight percent or more and 1.00 weight percent or less.

Other Components

The ink may further contain, as necessary, a known additive (more specifically, a dissolve stabilizer, an anti-drying agent, an antioxidant, a viscosity modifier, a pH modifier, a neutralizer, an antifungal agent, or the like). However, the ink may not contain the known additive.

Method for Synthesizing Quinacridone Pigment

The general outline of the method for synthesizing the quinacridone pigment is already described above. Hereinafter, an example of the method for synthesizing the quinacridone pigment is further described in detail.

In the reaction (r-a), the compound (B) is obtained from the compound (A). Next, in the reaction (r-b), 1 molar equivalent of the compound (B) and 2 molar equivalent of aniline derivative are reacted, and hence 1 molar equivalent of compound (C) is obtained. Next, in the reaction (r-c), the compound (C) is oxidized, and an oxide of the compound (C) is obtained. Next, in the reaction (r-c), the oxide of the compound (C) is hydrolyzed, and a hydrolysate is obtained. Next, in the reaction (r-c), a dehydroring-closing reaction of the hydrolysate is carried out using a catalyst, and the compound (D) is obtained. The reaction temperature of the dehydroring-closing reaction is, for example, 90 degrees centigrade or more and 120 degrees centigrade or less. The reaction time of the dehydroring-closing reaction is, for example, 1 hour or more or 2 hour or less.

After the reaction (r-c) is carried out, the quinacridone pigment as the compound (D) may undergo a solvent treatment process (hereinafter, may be referred to as the process A), and a post-processing process (hereinafter, may be referred to as the process B), for example.

Process A

In the process A, the quinacridone pigment is processed using a solvent. The quinacridone pigment before carrying out the process A is also referred to as crude and contains agglomerated particles having a low degree of crystallization. The quinacridone pigment before carrying out the process A has insufficient tinting strength. Therefore, by carrying out the process A, crystal growth of the quinacridone pigment and microparticulation of the quinacridone pigment are promoted. When crystal growth and microparticulation of the quinacridone pigment are promoted, tinting strength and color saturation of the quinacridone pigment are optimized. More specifically, by carrying out the process A, the crude of the quinacridone pigment becomes β-type or γ-type crystal of the quinacridone pigment, so that tinting strength and color saturation of the quinacridone pigment are improved. As the method for processing the quinacridone pigment, there is a method of kneading the quinacridone pigment and the solvent using a kneader (such as a salt milling kneader), for example. The temperature and the time of processing the quinacridone pigment are not particularly limited, and should be appropriately set so that desired particle size and particle size distribution of the quinacridone pigment will be obtained. The process A may be carried out while heating the quinacridone pigment. In addition, in the process A, an inorganic base (more specifically, sodium hydroxide, potassium hydroxide, or the like) as grinding aid may be added as necessary. The kneaded material of the quinacridone pigment obtained in the process A is washed with water or a solvent as necessary, to be a wet cake state, for example.

Process B

In the process B, the kneaded material of the quinacridone pigment obtained in the process A is post-processed. By carrying out the process B, the aggregation of the microparticulated quinacridone pigment is suppressed. By carrying out the process B, in addition to the tinting strength and color saturation of the quinacridone pigment given in the process A, good dispersibility and conservation stability can be given to the quinacridone pigment. As the post-process method, there is a method of removing the solvent from the kneaded material of the quinacridone pigment so as to separate the quinacridone pigment, for example. As the method for separating the quinacridone pigment, there are a filtering method, a drying method, and a method of distilling away the solvent by using a rotatory evaporator, for example. When distilling away the solvent, the temperature for distilling away the solvent is the boiling temperature of the solvent or higher, for example.

In at least one of the process A and the process B, the sulfur containing pigment derivative is preferably added. By adding the sulfur containing pigment derivative, aggregation of the quinacridone pigment is suppressed, and both dispersibility and conservation stability of the quinacridone pigment can be achieved. When adding the sulfur containing pigment derivative in the process B, the sulfur containing pigment derivative may be added when the process of separating the pigment composition from the kneaded material is started, or may be added during the separating process. The weight of the sulfur containing pigment derivative (the total weight of the sulfur containing pigment derivative added in the process A and the process B if the sulfur containing pigment derivative is added in both the process A and the process B), with respect to 100.0 mass parts of the quinacridone pigment, is preferably 0.5 mass parts or more and 15.0 mass parts or less, and more preferably 1.0 mass parts or more and 15.0 mass parts or less, and still more preferably 3.0 mass parts or more and 8.0 mass parts or less, and still more preferably 7.0 mass parts or more and 8.0 mass parts or less. If the weight of the sulfur containing pigment derivative with respect to 100.0 mass parts of the quinacridone pigment is 0.5 mass parts or more and 15.0 mass parts or less, hue of the quinacridone pigment is optimized. If the weight of the sulfur containing pigment derivative with respect to 100.0 mass parts of the quinacridone pigment is 3.0 mass parts or more and 8.0 mass parts or less, the predetermined sulfur concentration can be easily adjusted to a value within a desired range.

If the sulfur containing pigment derivative is added in both the process A and the process B, the type (such as chemical constitution) of the sulfur containing pigment derivative added in the process B may be the same as or different from the type of the sulfur containing pigment derivative added in the process A. In addition, if the sulfur containing pigment derivative is added in both the process A and the process B, in order to optimize the tinting strength of the quinacridone pigment, the weight of the sulfur containing pigment derivative added in the process B is preferably the same as or more than the weight of the sulfur containing pigment derivative added in the process A.

After the process B is carried out, the separated quinacridone pigment undergoes washing (e.g., washing with a filter press), drying, and grinding, as necessary. However, also after washing, the synthetic intermediates may remain in the quinacridone pigment. Therefore, when producing the ink, it is preferred to remove at least a part of the synthetic intermediates by carrying out the removal process (such as the activated carbon treatment) described later on the pigment dispersion liquid. In this way, occurrence of the ejection displacement of ink from the recording head can be suppressed.

Method for Producing Ink

An example of the method for producing the ink of the first embodiment is described. The produced ink is the ink of the first embodiment. The aqueous medium contained in the ink contains a first aqueous medium and a second aqueous medium. The method for producing the ink of the first embodiment includes a pigment composition preparation process, a pigment dispersion liquid preparation process, the removal process, and an ink preparation process.

Pigment Composition Preparation Process

In the pigment composition preparation process, the quinacridone pigment composition is prepared. The quinacridone pigment composition contains the quinacridone pigment and the sulfur containing pigment derivative (i.e., a quinacridone pigment derivative having a sulfur atom). As the predetermined sulfur concentration can be easily adjusted within a predetermined range, in the quinacridone composition prepared in the pigment composition preparation process, the content percentage of the sulfur containing pigment derivative with respect to the total weight of the quinacridone pigment and the sulfur containing pigment derivative is preferably 3.0 weight percent or more and 8.0 weight percent or less. If a commercially available quinacridone pigment composition is used, it is preferred to select a production lot having a desired content percentage of the sulfur containing pigment derivative.

Pigment Dispersion Liquid Preparation Process

In the pigment dispersion liquid preparation process, the quinacridone pigment composition, the pigment dispersion resin, and the first aqueous medium are mixed, and the pigment dispersion liquid is obtained. In the pigment dispersion liquid preparation process, the unabsorbed resin ratio (i.e., the ratio of the unabsorbed resin to the pigment dispersion resin) is adjusted to be 50 weight percent or less.

By mixing the components contained in the pigment dispersion liquid by wet dispersion using a media type wet disperser, the pigment dispersion liquid is prepared. As the media type wet disperser, there are, for example, bead mills (more specifically, "NanoGrain Mill" manufactured by Asada Ironworks co., Ltd., "MSC Mill" manufactured by Nippon Coke & Engineering Co., Ltd., and "DYNO (registered trademark)-MILL" manufactured by Willy A. Bachofen AG, and the like).

The discharge rate of the media type wet disperser is 200 g/min or more and 600 g/min or less, for example. There is a tendency that the unabsorbed resin ratio becomes lower as the discharge rate of the media type wet disperser becomes smaller.

In the wet dispersion using the media type wet disperser, beads having a small particle size (e.g., beads having a diameter of 0.5 mm or more and 1.0 mm or less) are used as the media, for example. By changing the diameter of the beads, the dispersion degree of the pigment particles and the unabsorbed resin ratio can be changed, for example. There is a tendency that $D_{50}$ of the pigment particles is smaller as the diameter of the beads is smaller. There is a tendency that as the diameter of the beads is smaller, the core containing the quinacridone pigment can be covered with the pigment dispersion resin more easily, and the unabsorbed resin ratio becomes lower. The material of the beads is not particularly limited, but is preferably a hard material (such as glass or zirconia).

The content percentage of the quinacridone pigment in the pigment dispersion liquid is preferably 5 weight percent or more and 25 weight percent or less, and more preferably 10 weight percent or more and 20 weight percent or less. The content percentage of the pigment dispersion resin in the pigment dispersion liquid is preferably 2 weight percent or more and 10 weight percent or less, and more preferably 4 weight percent or more and 8 weight percent or less. If the pigment dispersion liquid contains the surface acting agent, the content percentage of the surface acting agent in the pigment dispersion liquid is preferably 0.1 weight percent or more and 2 weight percent or less, and more preferably 0.3 weight percent or more and 1 weight percent or less.

The first aqueous medium is preferably water. In the pigment dispersion liquid preparation process, any added component (such as the surface acting agent) may be further mixed. The volume median diameter ($D_{50}$) of the pigment particles dispersed in the pigment dispersion liquid is preferably 70 nm or more and 130 nm or less

Removal Process

In the removal process, a part of the sulfur containing pigment derivative and at least a part of the synthetic intermediates of the quinacridone pigment remaining in the quinacridone pigment are removed from the pigment dispersion liquid. In the removal process, a part of the sulfur containing pigment derivative is removed from the pigment dispersion liquid so that the predetermined sulfur concentration become 0.4 ppm or more and 7.0 ppm or less. In the removal process, at least a part of the synthetic intermediates of the quinacridone pigment remaining in the quinacridone pigment is removed so that the predetermined light absorbance becomes 0.7 or less.

When using a commercially available quinacridone pigment composition, the contained amount of the sulfur containing pigment derivative in the quinacridone pigment composition, and the remaining amount of the synthetic intermediates may be different depending on production lots. When the removal process is carried out, variations of the contained amount of the sulfur containing pigment derivative and the remaining amount of the synthetic intermediates depending on production lots can be uniformed, and it is possible to obtain the ink in which the predetermined sulfur concentration and the predetermined light absorbance have values within desired ranges.

As the method of removing a part of the sulfur containing pigment derivative and at least a part of the synthetic intermediates from the pigment dispersion liquid, there is the activated carbon treatment. The activated carbon treatment is carried out by, for example, allowing the pigment dispersion liquid to flow through an activated carbon filter, and circulating the pigment dispersion liquid. When the ink contains the pigment dispersion liquid from which a part of the sulfur containing pigment derivative and at least a part of the synthetic intermediates are removed, the predetermined sulfur concentration and the predetermined light absorbance are easily adjusted to values within desired ranges.

In the activated carbon treatment, the flow rate of the circulated pigment dispersion liquid is 100 g/min or more and 300 g/min or less, for example. The time for circulating the pigment dispersion liquid is 5 minutes or more and 30 minutes or less, for example. When one pass means that the pigment dispersion liquid of 1,000 g passes through the activated carbon filter, the number of performing one pass (the number of pass times) in the activated carbon treatment is 5 or less, for example, and is preferably 2 or more and 5 or less.

Ink Preparation Process

In the ink preparation process, the pigment dispersion liquid after the removal process and the second aqueous medium are mixed so as to obtain the ink. The mixing is carried out using a stirrer, for example. The second aqueous medium is preferably a mixed solvent of water and water-soluble organic solvent, and more preferably a mixed solvent of water, triethylene glycol monobutyl ether, 3-methyl-1,5-pentanediol, and glycerin. The ratio of the pigment dispersion liquid in all the materials of the ink is, for example, 25 weight percent or more and 60 weight percent or less. In the ink preparation process, a component that is added as necessary (such as the surface acting agent) may be further mixed. After mixing components of the ink, it may be possible to remove foreign objects and coarse particles using a filter (a filter having an aperture of 5 μm or less). Note that the ink of the first embodiment can be appropriately used in an inkjet recording apparatus described later, for example.

Second Embodiment: Inkjet Recording Apparatus

Next, an inkjet recording apparatus of a second embodiment of the present disclosure is described. The inkjet recording apparatus of the second embodiment is equipped with a conveying unit that conveys a recording medium, and a recording head. The recording head ejects the ink of the first embodiment to the recording medium. Hereinafter, with reference to the drawings, details of the inkjet recording apparatus of the second embodiment are described. Note that in the drawings to be referred to, for easy understanding, components are schematically illustrated as subjects, and sizes and the number of the illustrated components may be different from reality.

Figure 2:
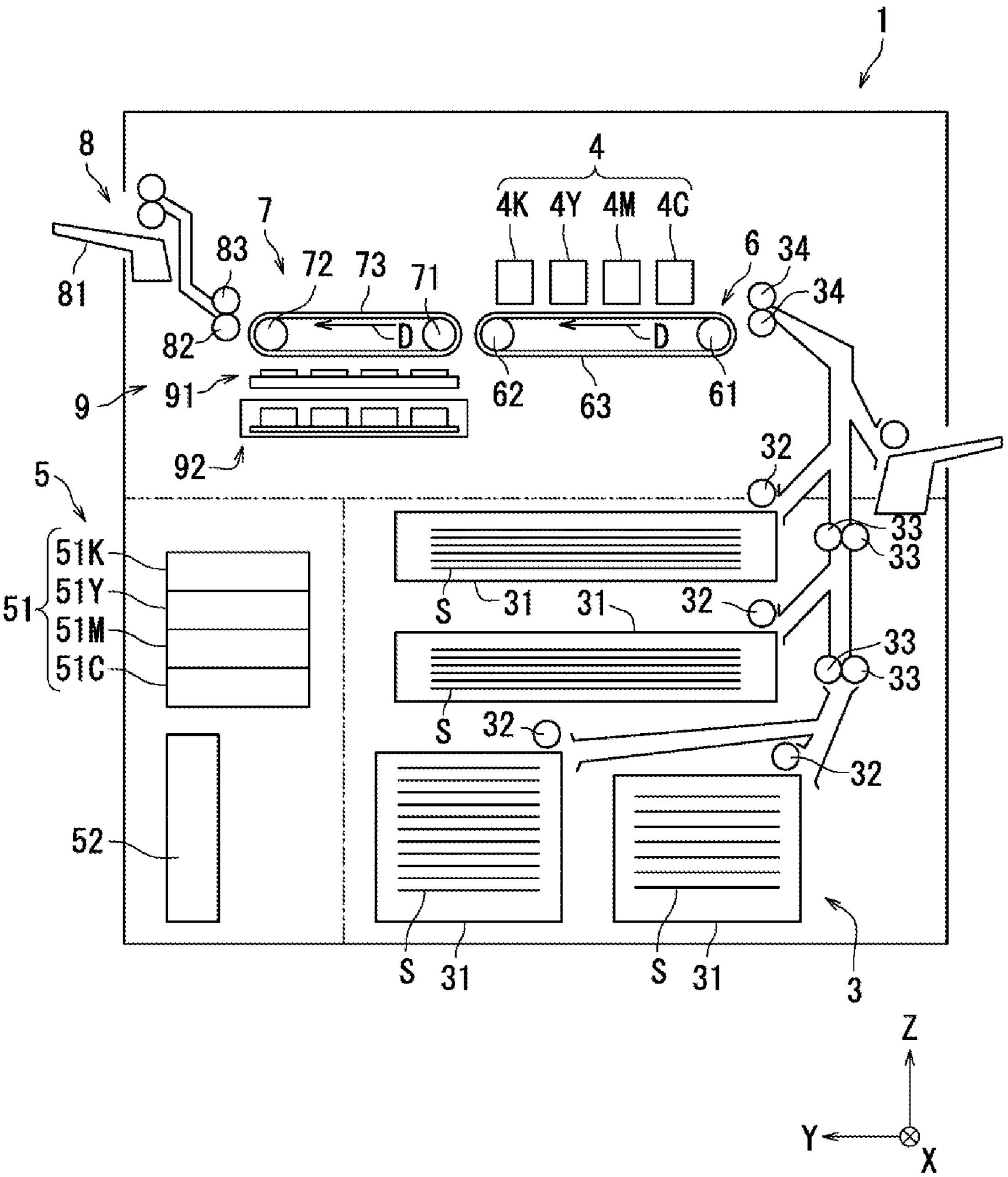
FIG. 2 is a diagram illustrating an example of an inkjet recording apparatus of a second embodiment of the present disclosure.

FIG. 2 is a diagram illustrating an inkjet recording apparatus 1 as an example of the inkjet recording apparatus according to the second embodiment. In FIG. 2, and FIGS. 3 to 5 described later, X-axis, Y-axis, and Z-axis are perpendicular to each other.

The inkjet recording apparatus 1 illustrated in FIG. 2 includes a paper feed unit 3, a first recording head 4C, a second recording head 4M, a third recording head 4Y, a fourth recording head 4K, a liquid container 5, a first conveying unit 6, a second conveying unit 7, a discharge unit 8, and a maintenance unit 9. Hereinafter, if it is not necessary to distinguish among the first to fourth recording heads 4C to 4K, they may be each referred to simply as a "recording head 4".

The paper feed unit 3 includes a plurality of sheet feed cassettes 31, a plurality of pickup rollers 32, a plurality of conveying rollers 33, and a registration roller pair 34. The sheet feed cassette 31 stores stacked recording media S. The pickup roller 32 takes out the recording media S stored in the sheet feed cassette 31, one by one. The conveying roller 33 conveys the recording medium S taken out by the pickup roller 32. The registration roller pair 34 allows the recording medium S conveyed by the conveying roller 33 to temporarily wait and then be supplied to the first conveying unit 6 at a predetermined timing.

The recording heads 4 are arranged above a first conveyor belt 63. The first to fourth recording heads 4C to 4K are aligned in this order in a conveying direction D of the recording medium S. The first to fourth recording heads 4C to 4K are arranged at the same height. The first to fourth recording heads 4C to 4K are respectively filled with four different color inks (e.g., cyan, magenta, yellow, and black inks). The ink filled in the second recording head 4M is the magenta ink, which is the ink of the first embodiment. The recording heads 4 each eject the ink to the recording medium S. Among the recording heads 4, the second recording head 4M ejects the ink of the first embodiment as the magenta color to the recording medium S. As a result, an image (e.g., a color image) is formed on the recording medium S conveyed by the first conveyor belt 63.

As the ink of the first embodiment is used, the inkjet recording apparatus 1 of the second embodiment can suppress occurrence of ejection displacement of the ink from the second recording head 4M, and has good dispersion stability of the ink, for the same reason as that described above in the first embodiment.

The liquid container 5 includes a first ink tank 51C, a second ink tank 51M, a third ink tank 51Y, a fourth ink tank 51K, and a cleaning liquid tank 52. Hereinafter, if it is not necessary to distinguish among the first to fourth ink tanks 51C to 51K, they may be each referred to simply as an "ink tank 51". The first to fourth ink tanks 51C to 51K respectively store four different color inks (e.g., cyan, magenta, yellow, and black inks). The ink stored in the second ink tank 51M is the magenta ink, which is the ink of the first embodiment. The first to fourth ink tanks 51C to 51K respectively supply the inks to the first to fourth recording heads 4C to 4K. The cleaning liquid tank 52 supplies the cleaning liquid to a liquid impregnation body 91.

The first conveying unit 6 is disposed on a downstream side of the paper feed unit 3 in the conveying direction D of the recording medium S. The first conveying unit 6 includes a first driven roller 61, a first driving roller 62, and the first conveyor belt 63. The first driving roller 62 is disposed on the downstream side of the first driven roller 61 in the conveying direction D of the recording medium S. The first conveyor belt 63 is an endless belt stretched around the first driven roller 61 and the first driving roller 62. The first driving roller 62 is driven to rotate in a counterclockwise direction in FIG. 2. In this way, the first driving roller 62 drives the first conveyor belt 63 to rotate. In this way, the first conveyor belt 63 conveys the recording medium S fed from the paper feed unit 3 to the second conveying unit 7 in the conveying direction D. The first driven roller 61 is driven to rotate by the first driving roller 62 via the first conveyor belt 63.

The second conveying unit 7 is disposed on the downstream side of the first conveying unit 6 in the conveying direction D of the recording medium S. The second conveying unit 7 includes a second driven roller 71, a second driving roller 72, and a second conveyor belt 73. The second driving roller 72 is disposed on the downstream side of the second driven roller 71 in the conveying direction D of the recording medium S. The second conveyor belt 73 is an endless belt stretched around the second driven roller 71 and the second driving roller 72. The second driving roller 72 is driven to rotate in the counterclockwise direction in FIG. 2. In this way, the second driving roller 72 drives the second conveyor belt 73 to rotate. In this way, second conveyor belt 73 conveys the recording medium S conveyed from the first conveying unit 6 to the discharge unit 8, in the conveying direction D. The second driven roller 71 is driven to rotate by the second driving roller 72 via the second conveyor belt 73.

The discharge unit 8 is disposed on the downstream side of the second conveying unit 7 in the conveying direction D of the recording medium S. The discharge unit 8 includes a discharge tray 81, a discharge driving roller 82, and a discharge driven roller 83. The discharge driving roller 82 and the discharge driven roller 83 are pressed to contact each other at facing positions. The discharge driving roller 82 is driven to rotate in the counterclockwise direction in FIG. 2. The discharge driven roller 83 rotates following the rotation of the discharge driving roller 82. In this way, the discharge driving roller 82 and the discharge driven roller 83 discharges the recording medium S conveyed from the second conveying unit 7 onto the discharge tray 81. The discharged recording medium S is placed on the discharge tray 81.

The maintenance unit 9 includes the liquid impregnation body 91, and a cleaning member 92. The liquid impregnation body 91 and the cleaning member 92 each can move between a position below the second conveying unit 7 and a position facing an ejection face 42 of the recording head 4 (see FIG. 3). The liquid impregnation body 91 impregnates the cleaning liquid. The liquid impregnation body 91 contacts with the ejection face 42 of the recording head 4 (see FIG. 3) so as to supply the cleaning liquid to the ejection face 42. The liquid impregnation body 91 is sponge, nonwoven fabric, or water absorbing sheet, for example. The cleaning member 92 wipes the ejection face 42 of the recording head 4. In this way, ink adhered to the ejection face 42 is cleaned. The cleaning member 92 is a rubber wiper, for example.

As the cleaning liquid, there is, for example, a mixture of water, polyhydric alcohol (first polyhydric alcohol), triethylene glycol monobutyl ether, lactam, and polyhydric alcohol (second polyhydric alcohol). In the cleaning liquid, content percentages of water, polyhydric alcohol (first polyhydric alcohol), triethylene glycol monobutyl ether, lactam, and polyhydric alcohol (second polyhydric alcohol) are preferably 60 weight percent or more and 70 weight percent or less, 10 weight percent or more and 15 weight percent or less, 5 weight percent or more and 10 weight percent or less, 5 weight percent or more and 10 weight percent or less, and 1 weight percent or more and 5 weight percent or less, respectively. As the cleaning liquid having this composition, there is cleaning liquid for head cleaning of TASKalfa Pro 15000c manufactured by KYOCERA Document Solutions Inc., for example.

Figure 3:
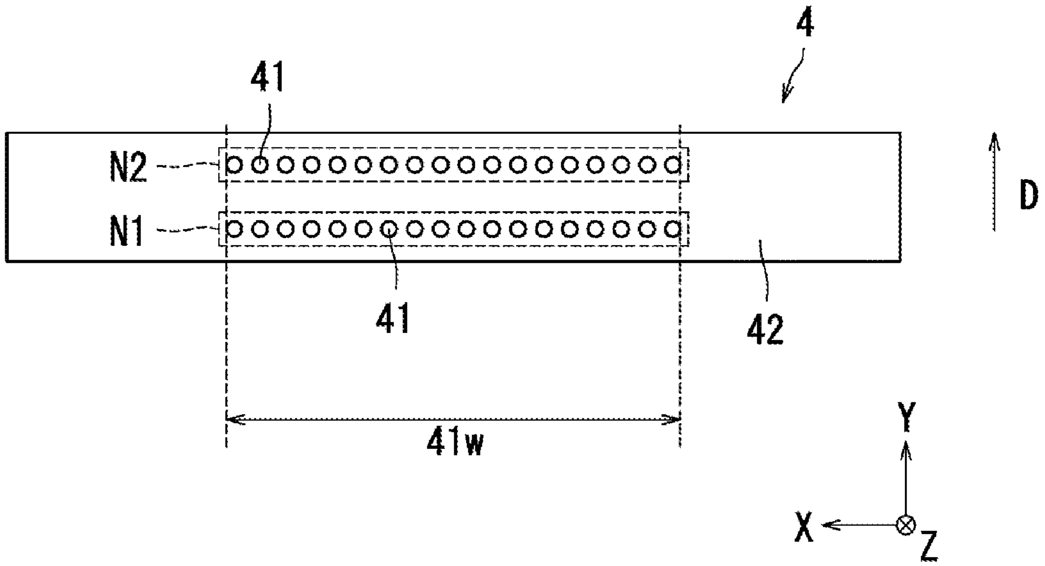
FIG. 3 is a diagram illustrating an underside of a recording head illustrated in FIG. 2.

Next, with reference to FIG. 3, the recording head 4 is further described. FIG. 3 is a diagram illustrating an underside of the recording head 4 illustrated in FIG. 2.

As illustrated in FIG. 3, the recording head 4 includes a first nozzle row N1, a second nozzle row N2, and the ejection face 42. For easy understanding, in FIG. 3, each of the first nozzle row N1 and the second nozzle row N2 is enclosed by a broken line. Each of the first nozzle row N1 and the second nozzle row N2 includes a plurality of nozzles 41. The nozzle 41 ejects the ink to the recording medium S. The nozzle 41 has an opening in the ejection face 42. The first nozzle row N1 and the second nozzle row N2 are disposed side by side in the conveying direction D of the recording medium S. In each of the first nozzle row NI and the second nozzle row N2, the plurality of nozzles 41 are arranged with spaces in a direction perpendicular to the conveying direction D of the recording medium S. The recording head 4 is a line head, for example.

A width 41*w* of each of the first nozzle row N1 and the second nozzle row N2 (i.e., a width of an area that can be recorded by the recording head 4) is the same as or more than the width of the recording medium S. Therefore, the recording head 4 in the fixed state can record an image on the recording medium S conveyed on the first conveyor belt 63. In other words, the inkjet recording apparatus 1 adopts a single pass method, which is a method without a shuttle movement. The inkjet recording apparatus 1 of the second embodiment, which is equipped with such the recording head 4, can print at a higher speed than an inkjet recording apparatus equipped with a serial head.

Figure 4:
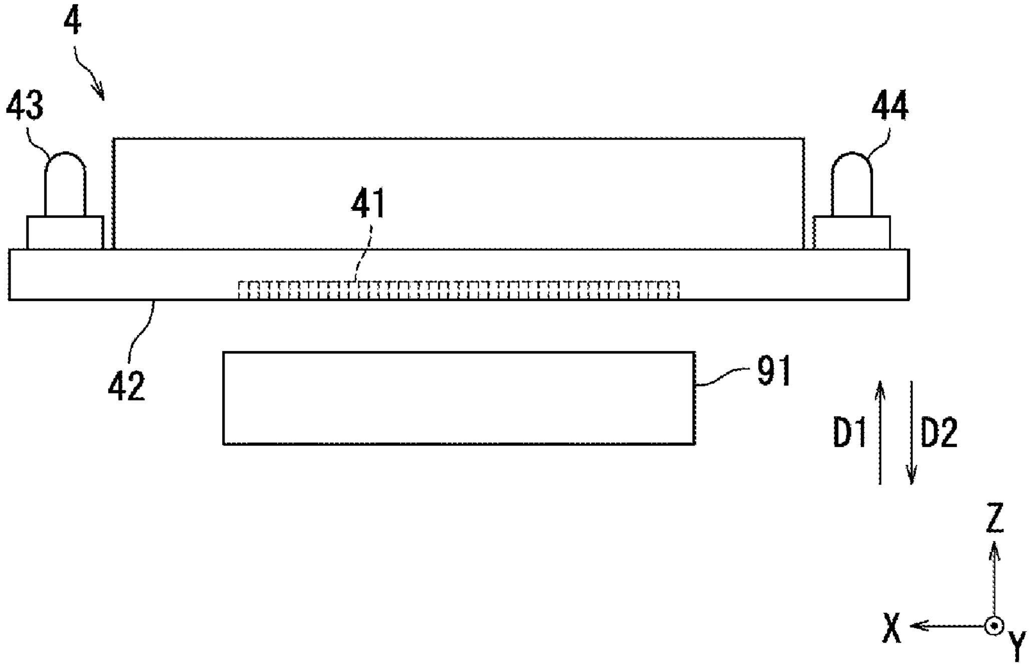
FIG. 4 is a diagram illustrating a supply operation of cleaning liquid.
Figure 5:
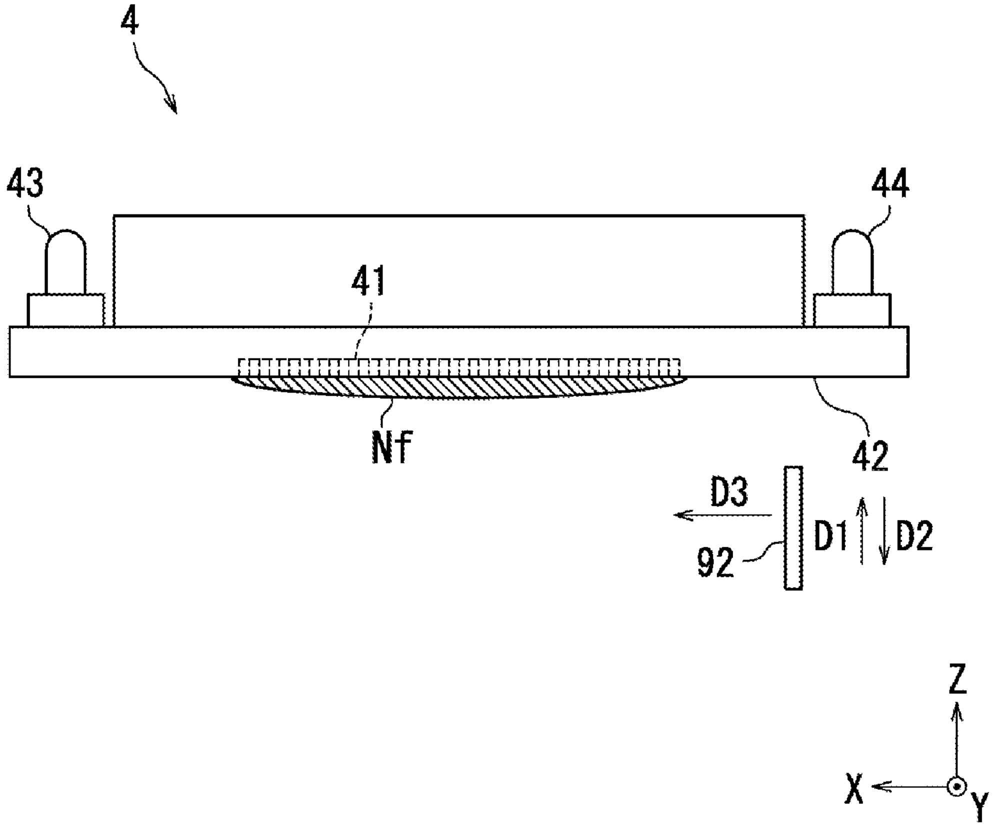
FIG. 5 is a diagram illustrating a purge operation and a wipe operation.

Next, with reference to FIGS. 4 and 5, the cleaning operation by the maintenance unit 9 is described. The cleaning operation includes a cleaning liquid supplying operation, a purge operation, and a wipe operation. FIG. 4 is a diagram illustrating the cleaning liquid supplying operation. FIG. 5 is a diagram illustrating the purge operation and the wipe operation. Note that the nozzles 41 cannot be viewed in a side view of the recording head 4, but for easy understanding, the positions of the nozzles 41 are illustrated by broken lines in FIGS. 4 and 5.

As illustrated in FIG. 4, the recording head 4 further includes an ink inlet 43 and an ink outlet 44. The ink from the ink tank 51 passes through the ink inlet 43 so as to flow into the recording head 4, and passes through the ink outlet 44 so as to flow out of the recording head 4.

As illustrated in FIG. 2, the liquid impregnation body 91 of the maintenance unit 9 is disposed below the second conveyor belt 73. The cleaning member 92 of the maintenance unit 9 is disposed below the liquid impregnation body 91. Each of the liquid impregnation body 91 and the cleaning member 92 can move between a position facing the second conveying unit 7 and a position facing the ejection face 42 of the recording head 4. Furthermore, the liquid impregnation body 91 can move in an upward direction D1 and in a downward direction D2 as illustrated in FIG. 4. The cleaning member 92 can move in the upward direction D1, in the downward direction D2, and in a wiping direction D3 as illustrated in FIG. 5. The "upward direction D1" is a direction approaching the ejection face 42 in the Z-axis direction. In addition, the "downward direction D2" is a direction separating from the ejection face 42 in the Z-axis direction. In addition, the "wiping direction D3" is a direction along the ejection face 42. Each of the liquid impregnation body 91 and the cleaning member 92 is moved by a known drive mechanism (not shown).

Here, the ink adhered to the ejection face 42 may be dried and fixed. In order to clean such the dried ink, the cleaning operation is carried out.

First, the cleaning liquid supplying operation in the cleaning operation is described. The cleaning liquid is impregnated in the liquid impregnation body 91. Next, as illustrated in FIG. 4, the liquid impregnation body 91 is moved to the position facing the ejection face 42, and is further moved in the upward direction D1. Then, the liquid impregnation body 91 is pressed to contact the ejection face 42. In this way, the cleaning liquid impregnated in the liquid impregnation body 91 is adhered to the ejection face 42. The state where the liquid impregnation body 91 is pressed to contact the ejection face 42 preferably continues for a predetermined period of time. The predetermined period of time is preferably 1 second or more and 5 minutes or less. After the predetermined period of time elapses, the liquid impregnation body 91 is moved in the downward direction D2. Then, the state where the liquid impregnation body 91 is pressed to contact the ejection face 42 is released.

Next, the purge operation is described. As illustrated in FIG. 5, the ink is purged from the recording head 4. In FIG. 5, the purged ink (purge ink) is denoted by "Nf". Specifically, when the recording head 4 is pressurized, the ink is forcibly discharged from the nozzles 41. In this way, clogging or the like of the nozzle 41 is resolved, and the purge ink Nf is adhered to the ejection face 42 of the recording head 4.

Next, the wipe operation is described. After the cleaning member 92 is moved to the position facing the ejection face 42 (the position illustrated in FIG. 5), it is moved in the upward direction D1. Then, the cleaning member 92 is pressed to contact the ejection face 42. While maintaining the state where the cleaning member 92 is pressed to contact the ejection face 42, the cleaning member 92 is moved in a direction along the ejection face 42 (in the wiping direction D3 illustrated in FIG. 5). In this way, the cleaning member 92 wipes the ejection face 42. As a result, the ink (such as the dried ink and the purge ink Nf) and the cleaning liquid adhered to the ejection face 42 are removed. In this way, the ejection face 42 of the recording head 4 is cleaned. Next, the cleaning member 92 is moved in the downward direction D2. Then, the state where the cleaning member 92 is pressed to contact the ejection face 42 is released.

If the ink of the first embodiment has good resolubility in addition to the property of suppressing occurrence of ejection displacement from the recording head 4 and good ink dispersion stability, even if the ink is adhered and dried on the ejection face 42 of the recording head 4, the dried ink is easily dissolved in at least one of the purge ink Nf and the cleaning liquid. When the dried ink is easily dissolved, the ejection face 42 of the recording head 4 can be easily cleaned.

Thus, the inkjet recording apparatus 1 as an example of the inkjet recording apparatus of the second embodiment is described above. However, the inkjet recording apparatus of the second embodiment is not limited to the inkjet recording apparatus 1. The inkjet recording apparatus of the second embodiment may adopt a multipass method. In addition, in the first to fourth recording heads 4C to 4K, the number of the nozzles 41, the interval of the nozzles 41, and the positional relationship of the nozzles 41 can be appropriately set in accordance with a specification of the apparatus. In addition, the arrangement order of the first to fourth recording heads 4C to 4K is not limited to that illustrated in the diagram, but may be other arrangement order. In addition, the number of the recording heads 4 is not limited to four, but may be three, or five or more. In addition, the cleaning liquid supplying operation may be discharge of the cleaning liquid by the inkjet method, application of the cleaning liquid using a roller, or spray of the cleaning liquid. In addition, the cleaning liquid supplying operation, the purge operation, and the wipe operation may each be repeated. In addition, the order of carrying out the cleaning liquid supplying operation and the purge operation is not limited. In addition, the cleaning member 92 may move reciprocatingly in the direction along the ejection face 42. For instance, while maintaining the state where the cleaning member 92 is pressed to contact the ejection face 42, the cleaning member 92 may move in a first direction along the ejection face 42 (in the wiping direction D3 illustrated in FIG. 5), and then it may move in a second direction along the ejection face 42 opposite to the first direction (in the direction opposite to the wiping direction D3 illustrated in FIG. 5).

EXAMPLE

Hereinafter, Example of the present disclosure is described. However, the present disclosure is not limited to the following Example. Note that in the following Example, ion-exchanged water may be referred to simply as water.

Preparation of Pigment Dispersion Resin

As the pigment dispersion resin used for preparation of the ink, resin (R-A) was prepared. The resin (R-A) had repeating units, which included a repeating unit derived from methacryl acid (MAA unit), a repeating unit derived from methacryl acid methyl (MMA unit), a repeating unit derived from acryl acid butyl (BA unit), and a repeating unit derived from styrene (ST unit). The resin (R-A) had a mass average molecular weight (Mw) of 20,000 and an acid number of 100 mgKOH/g. With respect to the weight of all repeating units of the resin (R-A), the content percentages of the MAA unit, the MMA unit, the BA unit, and the ST unit were 8.1 weight percent, 36.9 weight percent, 30.0 weight percent, and 25.0 weight percent, respectively.

Measurement of Acid Number of Resin

The acid number of the resin (R-A) was measured according to "JIS (Japanese Industrial Standard) K0070:1992".

Measurement of Mass Average Molecular Weight of Resin

The mass average molecular weight of the resin (R-A) was measured using a gel permeation chromatography ("HLC-8020GPC" manufactured by Tosoh Corporation)

according to the following conditions. Calibration curves were made using TSKgel Standard polystyrene produced by Tosoh Corporation, i.e., F-40, F-20, F-4, F-1, A-5000, A-2500, and A-1000, and n-propyl benzene.

Measurement Condition of Mass Average Molecular Weight column: "TSKgel SuperMultiporeHZ-H" produced by Tosoh Corporation (semi-micro column of 4.6 mmI.D.×15 cm)
the number of columns: 3
eluant: tetrahydrofuran
flow rate: 0.35 mL/min
sample injection volume: 10 μL
measurement temperature: 40 degrees centigrade
detector: RI (refraction index) detector

Preparation of Quinacridone Pigment Composition

To use for preparation of the ink, the following quinacridone pigment compositions were prepared. In the quinacridone pigment compositions (P-A) to (P-I), with respect to the total weight of the quinacridone pigment and the sulfur containing pigment derivative, the content percentages of the sulfur containing pigment derivative were as shown in Tables 3 to 5, respectively.

Preparation of Pigment Composition (P-A)

A wet cake of the quinacridone pigment (C.I. Pigment Red 122) having a solid content of 92.0 mass parts and 5.0 mass parts of methanol were mixed so as to obtain liquid mixture A. The whole liquid mixture A and 8.0 mass parts of the sulfur containing pigment derivative (1-1) were mixed so as to obtain a liquid mixture B. Methanol was distilled under reduced pressure from the liquid mixture B at 80 degrees centigrade so as to obtain a residue. The residue was filtered using water and dried at 80 degrees centigrade so as to obtain a dry matter. The dry matter was ground using Counterjet Mill (registered trademark) (manufactured by Hosokawa Micron Corporation) so as to obtain the pigment composition (P-A). In the pigment composition (P-A), the content percentage of the sulfur containing pigment derivative with respect to the total weight of the quinacridone pigment and the sulfur containing pigment derivative was 8.0 weight percent.

Preparation of Pigment Compositions (P-B) to (P-I)

The pigment compositions (P-B) to (P-I) were prepared in the same method as the preparation of the pigment composition (P-A), except for changing the type of the quinacridone pigment, the type of the sulfur containing pigment derivative, and the content percentage of the sulfur containing pigment derivative with respect to the total weight of the quinacridone pigment and the sulfur containing pigment derivative as shown in Tables 4 and 5. In each preparation of the pigment compositions (P-B) to (P-I), the total of the solid content amount of the quinacridone pigment and the additive amount of the sulfur containing pigment derivative was 100.0 mass parts.

Discussion 1

The ink obtained by changing mainly the number of pass times in the activated carbon treatment described later was discussed. The inks (A-1) to (A-4) and (B-1) to be used for the discussion were prepared by the following method.

Preparation of Ink (A-1)

Preparation of Pigment Dispersion Liquid

The pigment dispersion liquid was prepared so as to obtain composition d-a shown in Table 1.

TABLE 1

| pigment dispersion liquid | composition d-a (mass parts) |
|---|---|
| water | remaining amount |
| resin (R-A) | 6.0 |
| sodium hydroxide | predetermined amount |
| quinacridone pigment composition | 15.0 |
| Olfine E1010 | 0.5 |
| total | 100 |

Terms in Table 1 are defined as follows. "Olfine E1010" represents a non-ionic surface acting agent ("Olfine (registered trademark) E1010" produced by Nissin Chemical Industry Co., Ltd., having content of ethylene oxide adduct of acetylene diol, active ingredient concentration of 100 weight percent, and HLB value of 13.5±0.5).

First, 6.0 mass parts of the resin (R-A) and sodium hydroxide aqueous solution were mixed. The sodium hydroxide aqueous solution contained a predetermined amount of sodium hydroxide. The "predetermined amount" as the additive amount of sodium hydroxide shown in Table 1 is 1.05 times the amount necessary for equal neutralization of the resin (R-A). In this way, the resin (R-A) was neutralized by the equal amount (strictly, 105% equivalence) of sodium hydroxide, so as to obtain aqueous solution I containing the resin (R-A).

The whole amount of the obtained aqueous solution I, 15.0 mass parts of the quinacridone pigment composition (P-A), 0.5 mass parts of the non-ionic surface acting agent ("Olfine (registered trademark) E1010" produced by Nissin Chemical Industry Co., Ltd.), and remaining amount of water were put into a vessel. Using a media type wet disperser ("DYNO (registered trademark) -MILL" manufactured by Willy A. Bachofen AG (WAB)), the content of the vessel was mixed so as to obtain liquid mixture II.

Note that the "remaining amount" as additive amount of water shown in Table 1 means an amount that makes 100.0 mass parts of the liquid mixture II. The remaining amount of water shown in Table 1 is total amount of the water put into the vessel and water contained in the aqueous solution I (specifically, water contained in the sodium hydroxide aqueous solution used to neutralize the resin, and water generated in the neutralization reaction of the resin and the sodium hydroxide).

Next, using zirconia beads (particle size 0.5 mm) as media and a bead mill ("NanoGrain Mill" manufactured by Asada Ironworks co., Ltd.), dispersing process of the content of the vessel was carried out. Conditions of dispersing by the bead mill were a temperature of 10 degrees centigrade, a peripheral speed of 8 m/sec, and a discharge rate of 450 g/min. In this way, the pigment dispersion liquid III before the activated carbon treatment was obtained.

It was confirmed that pigment particles having a volume median diameter in a range of 70 nm or more and 130 nm or less were dispersed in the pigment dispersion liquid III. The volume median diameter of the pigment particles was measured using a measurement sample that was a diluent of the pigment dispersion liquid III diluted with water by 300 times, and the dynamic light scattering type particle size distribution analyzer ("Zetasizer Nano ZS" manufactured by Spectris Co., Ltd.).

Activated Carbon Treatment

The activated carbon treatment of the obtained pigment dispersion liquid III was carried out. Specifically, 1,800 g of the pigment dispersion liquid III was allowed to pass through the activated carbon filter ("YCC-1L" produced by Nihon Filter Co., Ltd., in which the activated carbon type is granular coconut shell activated carbon), and the pigment dispersion liquid III was circulated at a flow rate of 190 g/min. Hereinafter, one pass means that 1,000 g of the pigment dispersion liquid III passes through the activated carbon filter. As the flow rate was 190 g/min, time necessary for one pass was 5 minutes 15 seconds (=(1,000 g)/(190 g/min)). When 10 passes were completed, circulation of the pigment dispersion liquid III was stopped so as to obtain the pigment dispersion liquid IV after the activated carbon treatment. Therefore, in the activated carbon treatment, the number of performing one pass (the number of pass times) was 10.

Preparation of Ink

The ink (A-1) was prepared so as to obtain composition i-a shown in Table 2

TABLE 2

| ink | composition i-a (mass parts) |
|---|---|
| pigment dispersion liquid | 40.0 |
| Surfynol 420 | 0.3 |
| triethylene glycol monobutyl ether | 4.0 |
| 3-methyl-1,5-pentanediol | 20.0 |
| glycerin | 5.0 |
| water | remaining amount |
| total | 100.0 |

Terms in Table 2 are defined as follows. "Surfynol 420" represents a non-ionic surface acting agent ("Surfynol (registered trademark) 420" produced by Nissin Chemical Industry Co., Ltd., having content of ethylene oxide adduct of acetylene glycol, active ingredient concentration of 100 weight percent, and HLB value of 4).

First, water was put into a flask equipped with a stirrer ("Three-one motor (registered trademark) BL-600" manufacture by Shinto Scientific Co., Ltd.). While stirring the content of the flask using the stirrer at a stirring speed of 400 rpm, the pigment dispersion liquid IV obtained in the above activated carbon treatment, non-ionic surface acting agent ("Surfynol (registered trademark) 420" produced by Nissin Chemical Industry Co., Ltd.), triethylene glycol monobutyl ether, 3-methyl-1,5-pentanediol, and glycerin were put in, so as to obtain liquid mixture V. The input amount of each raw material was as shown in Table 2. The "remaining amount" as additive amount of water shown in Table 2 means an amount that makes 100.0 mass parts of the liquid mixture V. The liquid mixture V was filtered using a filter having an aperture of 5 μm, and hence foreign objects and coarse particles were removed from the liquid mixture V. In this way, the ink (A-1) was obtained.

Preparation of Inks (A-2) to (A-4) and (B-1)

The ink (A-2) to (A-4) were prepared in the same method as the preparation of the ink (A-1), except for changing the number of performing one pass (the number of pass times) in the activated carbon treatment as shown in Table 3 described later. In addition, the ink (B-1) was prepared in the same method as the preparation of the ink (A-1), except that the activated carbon treatment was not carried out.

Measurement

The measuring object (each of the inks (A-1) to (A-4) and (B-1)) was centrifugalized by the following method. Further, for each obtained supernatant liquid, predetermined sulfur concentration, predetermined light absorbance, and unabsorbed resin ratio were measured. The measurement result is shown in Table 3.

Centrifuging Process

The centrifuging process of the measuring object of 2 g sealed in a container was carried out at a rotational frequency of 140,000 rpm (corresponding to a centrifugal force of 1,050,000 G) for three hours under environment of temperature of 23 degrees centigrade, using an ultracentrifuge ("himac (registered trademark) CS150FNX" manufactured by Eppendorf Himac Technologies Co., Ltd., having a rotor of S140AT). In this way, the pigment particles contained in the ink as the measuring object were precipitated.

Predetermined Sulfur Concentration

The supernatant liquid contained in the ink after the centrifuging process was collected with a syringe of 1 mL. The collected supernatant liquid is diluted with water by ten times to be a measurement sample. The measurement sample was measured using an inductively coupled plasma (ICP) weight analyzing device ("iCAP PRO ICP-OES Duo" manufactured by Thermo Fisher Scientific Inc.). The measured value of the measurement sample (i.e., the sulfur concentration in 10-fold diluent of the supernatant liquid) was regarded as the predetermined sulfur concentration (ppm). Note that the sulfur concentration was determined using a calibration curve generated using a sample having a known sulfur concentration.

Predetermined Light Absorbance

The supernatant liquid contained in the ink after the centrifuging process was collected with a syringe of 1 mL. The collected supernatant liquid was diluted with water by 25 times to be a measurement sample. The measurement sample in a cell was measured using a spectral photometer ("U-3000" manufactured by Hitachi High-Tech Science Corporation) under the following conditions, so as to obtain the ultraviolet and visible ray absorption spectrum of the measurement sample. From the ultraviolet and visible ray absorption spectrum of the measurement sample, a wavelength (nm) was read, at which a predetermined peak appears in the measurement sample (i.e., the 25-fold diluent of the supernatant liquid). In addition, from the ultraviolet and visible ray absorption spectrum of the measurement sample, light absorbance at the predetermined peak in the measurement sample (i.e., the 25-fold diluent of the supernatant liquid) was read, and the read light absorbance was regarded as the predetermined light absorbance. Note that the predetermined peaks of the inks (A-1) to (A-4) and (B-1) were confirmed to be each 429 nm.

Measurement Condition of Light Absorbance measurement wavelength range: 200 nm or more and 800 nm or less
scan speed: 300 nm/min
sampling interval: 1.00 nm
slit width: 1 nm
cell: quartz glass cell
optical path length: 10 mm
beam method: double beam
base line measurement: done
reference: ion-exchanged water Unabsorbed Resin Ratio The whole amount of the supernatant liquid contained in the ink after the centrifuging process was collected. Next, the whole amount of the collected supernatant liquid was dried under reduced pressure at 60 degrees centigrade for 24 hours, so as to obtain a residue. A weight (WA) of the residue was measured. The weight (WA) of the residue was regarded as a weight of the unabsorbed resin.

Weight (WD) of the pigment dispersion resin contained in 2 g of ink was calculated from content percentage B (=6.0 weight percent) of the pigment dispersion resin (R-A) in the pigment dispersion liquid, which can be read from Table 1, and content percentage C(=40.0 weight percent) of the pigment dispersion liquid in the ink, which can be read from Table 2, according to the following equation.

$$WD=2\times(C/100)\times(B/100)$$

Further, the unabsorbed resin ratio was calculated from the weight (WA) of the residue obtained from the 2 g of ink, and the weight (WD) of the pigment dispersion resin contained in the 2 g of ink, according to the following equation.

$$\text{unabsorbed resin ratio (weight percent)}=100\times WA/WD$$

Evaluation

For the evaluation target (each of the inks (A-1) to (A-4) and (B-1)), dischargeability, resolubility, and dispersion stability were evaluated by the following method. The evaluation result is shown in Table 3.

TABLE 3

| | | EX1 | EX2 | EX3 | EX4 | CEX1 |
|---|---|---|---|---|---|---|
| ink | | A-1 | A-2 | A-3 | A-4 | B-1 |
| pigment | type | P-A | P-A | P-A | P-A | P-A |
| composition | pigment | PR122 | PR122 | PR122 | PR122 | PR122 |
| | derivative | 1-1 | 1-1 | 1-1 | 1-1 | 1-1 |
| | derivative ratio (wt %) | 8.0 | 8.0 | 8.0 | 8.0 | 8.0 |
| discharge rate (g/min) | | 450 | 450 | 450 | 450 | 450 |
| number of pass times | | 10 | 5 | 1 | 20 | zero |
| unabsorbed resin ratio (wt %) | | 50 | 50 | 50 | 50 | 50 |
| predetermined light absorbance | | 0.22 | 0.24 | 0.41 | 0.15 | 0.70 |
| predetermined sulfur concentration (ppm) | | 2.1 | 2.7 | 6.5 | 1.5 | 9.0 |
| dischargeability | | A | A | A | A | B |
| resolubility | | A | A | A | N | A |
| dispersion | post-storage | 120 | 125 | 126 | 120 | 110 |
| stability | $D_{50}$ (nm) | | | | | |
| | determination | A | A | A | A | A |

Dischargeability

As an evaluation machine that is used for evaluation, an inkjet recording apparatus (a prototype manufactured by Kyocera Document Solutions Japan Inc.) was used. This evaluation machine was equipped with a conveying unit, a piezo method line head having nozzles (having a radius of aperture of 10 μm) as the recording head, and a wiper. The ink as the evaluation target was set to the magenta ink recording head of the evaluation machine. As paper sheets, plain paper sheets ("C2" produced by Fuji Xerox Co., Ltd., A4 size PPC sheets) were used.

The temperature of the recording head was set to 40 degrees centigrade. The ink discharge rate per one pixel was set to 3.5 pL. Using the evaluation machine, an image (20.5 mm×29.0 mm) of image processing setting for discharging ink from all nozzles of the recording head was printed on paper sheets continuously for an hour. The first printed image of the continuous printing (initial image) and the last printed image of the continuous printing (printing durability image) were observed with the naked eye. Further, it was checked whether or not there was a white streak in each of the initial image and the printing durability image. The white streak is an image defect caused by the ejection displacement of ink from the recording head. The dischargeability of ink from the recording head was determined according to the following criterion.

Criterion of Dischargeability

Good (A): The printing durability image does not have more white streaks than the initial image.

Bad (B): The printing durability image has more white streaks than the initial image.

Resolubility

The resolubility was evaluated using the same evaluation machine as the evaluation of the dischargeability described above. The ink of 0.3 mL was put on the tip of the wiper of the evaluation machine, and was left in an environment of temperature of 25 degrees centigrade and humid of 60% RH for 10 minutes. Next, using the wiper with the ink, the ejection face of the recording head was wiped in an outward direction (direction opposite to the wiping direction D3 in FIG. 5), so as to spread the ink on the ejection face. The spread ink is dried at 45 degrees centigrade for four days, so as to form dried ink on the ejection face.

After forming the dried ink, cleaning operation was carried out using the evaluation machine. Specifically, the nonwoven fabric impregnated with 3 g of the cleaning liquid was allowed to make intimate contact with the ejection face of the recording head for 30 seconds (corresponding to the cleaning liquid supplying operation). As the cleaning liquid, cleaning liquid for head cleaning of an inkjet color production printer "TASKalfa Pro 15000c" manufactured by Kyocera Document Solutions Inc. was used. As the nonwoven fabric, a cut product of "Bemcot (registered trademark) M-3II" produced by Asahi Kasei Corporation was used. Next, the nonwoven fabric was separated from the ejection face of the recording head. Next, 0.3 mL of ink was forcibly discharged (purged) from the recording head (corresponding to the purge operation). Next, using the wiper, the ejection face of the recording head was wiped in a return direction (the wiping direction D3 in FIG. 5) (corresponding to the wipe operation). In this way, the dried ink adhered to the ejection face of the recording head was removed together with the cleaning liquid and the purge ink. Details of the cleaning operation carried out in this test are mostly the same as the cleaning operation described above with reference to FIGS. 4 and 5. Next, the ejection face of the recording head was observed with the naked eye, and it was checked whether or not there was the dried ink remaining uncleaned. Note that there is a tendency that as the dried ink is dissolved in the cleaning liquid or the purge ink more easily, the dried ink adhered to the ejection face of the recording head can be removed more easily. The resolubility of the ink was determined according to the following evaluation criterion. The ink of Good (A) or Normal (N) was determined to be accepted, while the ink of Bad (B) was determined to be rejected.

Criterion of Resolubility

Good (A): The dried ink is not observed on the ejection face of the recording head.

Normal (N): The dried ink is slightly observed on the ejection face of the recording head, but to an extent there is no practical problem.

Bad (B): The dried ink is clearly observed on the ejection face of the recording head.

Dispersion Stability

The ink of 30 g was put in a container having a volume of 50 mL, and the container was sealed. The container was put in an incubator whose internal temperature was set to 40 degrees centigrade, and was stored for two weeks. After two weeks of storage, the ink in the container was diluted with water by 100 times to be a measurement sample. Using a dynamic light scattering type particle size distribution analyzer ("Zetasizer Nano ZS" manufactured by Malvern Instruments Ltd.), a volume median diameter of the pigment particles contained in the measurement sample (post-storage $D_{50}$) was measured. The dispersion stability was determined according to the following criterion. Note that there is a tendency that if the post-storage $D_{50}$ is 140 nm or more, the pigment particles in the ink have low dispersion stability, and precipitation of the pigment particles and a decrease in ink density are caused during storage of the ink.

Criterion of Dispersion Stability

Good (A): The post-storage $D_{50}$ is less than 140 nm.

Bad (B): The post-storage $D_{50}$ is 140 nm or more.

Terms in Table 3, and Tables 4 and 5 described later are defined as follows. "EX" represents Example, and "CEX" represents Comparative Example. "Pigment composition" represents the quinacridone pigment composition. "Derivative" represents the sulfur containing pigment derivative contained in the quinacridone pigment composition. "Derivative ratio" represents the content percentage of the sulfur containing pigment derivative with respect to the total weight of the quinacridone pigment and the sulfur containing pigment derivative. "PR122" represents C.I. Pigment Red 122. "PV19" represents C.I. Pigment Violet 19. "Discharge rate" represents the discharge rate of the bead mill in the preparation of the pigment dispersion liquid. "Number of pass times" represents the number of one passes in the activated carbon treatment. "Zero" in the row of "Number of pass times" means that the activated carbon treatment was not carried out. The unit "wt %" represents weight percent.

As shown in Table 3, the predetermined sulfur concentration of the ink (B-1) was more than 7.0 ppm. The evaluation result of the dischargeability of the ink (B-1) was Bad, and the ejection displacement of ink from the recording head occurred.

On the other hand, as shown in Table 3, the inks (A-1) to (A-4) contained the quinacridone pigment, the pigment dispersion resin, and the aqueous medium. The unabsorbed resin ratio was 50 weight percent or less. The predetermined sulfur concentration was 0.4 ppm or more and 7.0 ppm or less. The predetermined light absorbance was 0.7 or less. The evaluation results of the dischargeability and the dispersion stability of the inks (A-1) to (A-4) were Good.

Further, as shown in Table 3, the predetermined sulfur concentrations of the inks (A-1) to (A-3) were 2.0 ppm or more and 7.0 ppm or less. The predetermined sulfur concentration of the ink (A-4) was 1.5 ppm. The resolubilities of the inks (A-1) to (A-3) were more superior to the resolubility of the ink (A-4).

Discussion 2

The ink was discussed, which was obtained by changing mainly the content percentage of the sulfur containing pigment derivative, the discharge rate of the bead mill in the preparation of the pigment dispersion liquid, and the number of pass times in the activated carbon treatment. In Discussion 2, the inks (A-5) to (A-13) and (B-2) to (B-5) were used. The inks (A-5) to (A-13) and (B-2) to (B-5) were prepared by the same method as the preparation of the ink (A-1), except for changing the following items. In the preparation of the pigment dispersion liquid described above, the quinacridone pigment composition shown in Tables 4 and 5 described later was used instead of the quinacridone pigment composition (P-A). In the preparation of the pigment dispersion liquid described above, the discharge rate of the bead mill was changed as shown in Tables 4 and 5. In the preparation of the inks (A-5) and (B-5), the activated carbon treatment was not performed. In the activated carbon treatment of the inks (A-6) to (A-13) and (B-2) to (B-4), the number of pass times was changed as shown in Tables 4 and 5.

For the inks (A-5) to (A-13) and (B-2) to (B-5), in the same method as Discussion 1 described above, the predetermined sulfur concentration, the predetermined light absorbance, and the unabsorbed resin ratio were measured, and the dischargeability, the resolubility, and the dispersion stability were evaluated. The measurement result and the evaluation result are shown in Tables 4 and 5. Note that the predetermined peaks of the inks (A-5) to (A-13) and (B-2) to (B-5) were confirmed to be each 429 nm.

Initial $D_{50}$

Further, for the inks (A-5) to (A-13) and (B-2) to (B-5), the volume median diameter (initial D50) of the pigment particles contained in the ink just after the preparation was measured by the following method. The ink just after the preparation was diluted with water by 100 times to be a measurement sample. Using a dynamic light scattering type particle size distribution analyzer ("Zetasizer Nano ZS" manufactured by Malvern Instruments Ltd.), the volume median diameter of the pigment particles contained in the measurement sample (initial $D_{50}$) was measured. The measurement result is shown in Tables 4 and 5.

Table 4 is as follows.

TABLE 4

| | | EX5 | EX6 | EX7 | EX8 | EX9 | EX10 | EX11 |
|---|---|---|---|---|---|---|---|---|
| ink | | A-5 | A-6 | A-7 | A-8 | A-9 | A-10 | A-11 |
| Pigment | type | P-B | P-B | P-B | P-C | P-D | P-E | P-F |
| composition | pigment | PR122 | PR122 | PR122 | PR122 | PR122 | PR122 | PR122 |
| | derivative | 1-1 | 1-1 | 1-1 | 1-1 | 1-1 | 1-1 | 1-1 |
| | Derivative ratio (wt %) | 6.5 | 6.5 | 6.5 | 5.5 | 5.0 | 4.5 | 3.0 |
| discharge rate (g/min) | | 600 | 600 | 500 | 350 | 400 | 400 | 350 |
| number of pass times | | zero | 1 | 1 | 5 | 5 | 10 | 10 |
| unabsorbed resin ratio (wt %) | | 50 | 30 | 20 | 10 | 20 | 30 | 20 |
| predetermined light absorbance | | 0.21 | 0.33 | 0.38 | 0.70 | 0.50 | 0.15 | 0.42 |
| predetermined sulfur concentration (ppm) | | 6.8 | 5.2 | 4.0 | 2.1 | 3.5 | 1.5 | 0.4 |
| initial $D_{50}$ (nm) | | 103 | 112 | 122 | 135 | 130 | 130 | 135 |
| dischargeability | | A | A | A | A | A | A | A |
| resolubility | | A | A | A | A | A | N | N |
| Dispersion stability | post-storage $D_{50}$ (nm) | 110 | 118 | 125 | 137 | 136 | 136 | 139 |
| | determination | A | A | A | A | A | A | A |

Table 5 is as follows.

TABLE 5

| | | EX12 | EX13 | CEX2 | CEX3 | CEX4 | CEX5 |
|---|---|---|---|---|---|---|---|
| ink | | A-12 | A-13 | B-2 | B-3 | B-4 | B-5 |
| Pigment | type | P-H | P-I | P-B | P-G | P-B | P-G |
| composition | pigment | PV19 | PR122 | PR122 | PR122 | PR122 | PR122 |
| | derivative | 1-1 | 1-2 | 1-1 | 1-1 | 1-1 | 1-1 |
| | Derivative ratio (wt %) | 8.0 | 8.0 | 6.5 | 10.0 | 6.5 | 10.0 |
| discharge rate (g/min) | | 400 | 400 | 500 | 300 | 750 | 300 |
| number of pass times | | 1 | 1 | 10 | 1 | 5 | zero |
| unabsorbed resin ratio (wt %) | | 20 | 30 | 20 | 10 | 80 | 30 |
| predetermined light absorbance | | 0.21 | 0.25 | 0.22 | 0.25 | 0.60 | 0.85 |
| predetermined sulfur concentration (ppm) | | 5.1 | 4.0 | 0.3 | 8.5 | 3.5 | 9.0 |
| initial $D_{50}$ (nm) | | 95 | 100 | 140 | 95 | 130 | 95 |
| dischargeability | | A | A | A | B | B | B |
| resolubility | | A | A | N | A | N | A |
| Dispersion stability | post-storage $D_{50}$ (nm) | 100 | 105 | 142 | 110 | 135 | 153 |
| | determination | A | A | B | A | A | B |

As shown in Table 5, the predetermined sulfur concentration of the ink (B-2) was less than 0.4 ppm. The evaluation result of the dispersion stability of the ink (B-2) was Bad.

As shown in Table 5, the predetermined sulfur concentration of the ink (B-3) was more than 7.0 ppm. The evaluation result of the dischargeability of the ink (B-3) was Bad, and the ejection displacement of ink from the recording head occurred.

As shown in Table 5, the unabsorbed resin ratio of the ink (B-4) was more than 50 weight percent. The evaluation result of the dischargeability of the ink (B-4) was Bad, and the ejection displacement of ink from the recording head occurred.

As shown in Table 5, the predetermined light absorbance of the ink (B-5) was more than 0.7, and the predetermined sulfur concentration of the same was more than 7.0 ppm. The evaluation result of the dischargeability of the ink (B-5) was Bad, and the ejection displacement of ink from the recording head occurred. In addition, the evaluation result of the dispersion stability of the ink (B-5) was Bad.

On the other hand, as shown in Tables 4 and 5, the inks (A-5) to (A-13) contained the quinacridone pigment, the pigment dispersion resin, and the aqueous medium. The unabsorbed resin ratio was 50 weight percent or less. The predetermined sulfur concentration was 0.4 ppm or more and 7.0 ppm or less. The predetermined light absorbance was 0.7 or less. The evaluation results of the dischargeability and the dispersion stability of the inks (A-5) to (A-13) were Good.

Further, as shown in Tables 4 and 5, the predetermined sulfur concentrations of the inks (A-5) to (A-9) and (A-12) to (A-13) were 2.0 ppm or more and 7.0 ppm or less. The predetermined sulfur concentrations of the inks (A-10) to (A-11) were less than 2.0 ppm. The resolubilities of the inks (A-5) to (A-9) and (A-12) to (A-13) were more superior to resolubilities of the inks (A-10) to (A-11).

From above discussion, the ink of the present disclosure including the inks (A-1) to (A-13), and the inkjet recording apparatus of the present disclosure using such the ink are determined to be able to suppress occurrence of the ejection displacement of ink from the recording head, and to be superior in dispersion stability of the ink.

In this way, the inkjet ink and the inkjet recording apparatus according to the present disclosure can suppress occurrence of ejection displacement from the recording head and are superior in dispersion stability.

The ink and the inkjet recording apparatus of the present disclosure can be used for forming images.

What is claimed is:

1. An inkjet ink containing quinacridone pigment, pigment dispersion resin, and aqueous medium, wherein the pigment dispersion resin contains absorbed resin that is absorbed by the quinacridone pigment, and unabsorbed resin that is not absorbed by the quinacridone pigment, a ratio of the unabsorbed resin to the pigment dispersion resin is 50 weight percent or less, a sulfur concentration in 10-fold diluent of supernatant liquid obtained by centrifuging the inkjet ink at 1,050, 000 G for three hours is 0.4 ppm or more and 7.0 ppm or less, and in an ultraviolet and visible ray absorption spectrum of 25-fold diluent of the supernatant liquid, light absorbance at a predetermined peak is 0.7 or less, and the predetermined peak is a maximum peak in a wavelength range of 400 nm or more and 490 nm or less.

2. The inkjet ink according to claim 1, wherein the ratio of the unabsorbed resin to the pigment dispersion resin is 10 weight percent or more and 50weight percent or less.

3. The inkjet ink according to claim 1, wherein the sulfur concentration is 2.0 ppm or more and 7.0 ppm or less.

4. The inkjet ink according to claim 1, wherein the light absorbance at the predetermined peak is 0.2 or more and 0.7 or less.

5. The inkjet ink according to claim 1 further containing quinacridone derivative containing sulfur atoms, wherein the sulfur concentration is concentration of the sulfur atoms contained in the quinacridone derivative in the 10-fold diluent of the supernatant liquid.

6. The inkjet ink according to claim 5, wherein the quinacridone derivative is a compound expressed by formula (1).

(1)

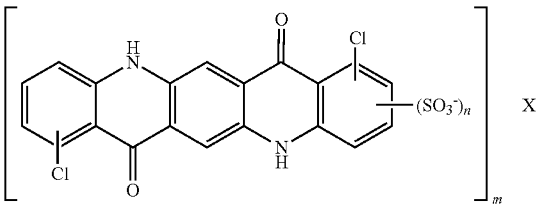

(In the formula (1), n is an integer of 1 or more and 3 or less, m is an integer of 1 or more and 3 or less, and X represents a metallic ion).

7. The inkjet ink according to claim 6, wherein X represents $Al^{3+}$ or $Mg^{2+}$ in the formula (1).

8. The inkjet ink according to claim 5, wherein the content percentage of the quinacridone derivative with respect to total weight of the quinacridone pigment and the quinacridone derivative is 3.0 weight percent or more and 8.0 weight percent or less.

9. The inkjet ink according to claim 1, wherein the predetermined peak is a peak derived from a synthetic intermediate of the quinacridone pigment remaining in the quinacridone pigment.

10. The inkjet ink according to claim 9, wherein the synthetic intermediate of the quinacridone pigment is a compound expressed by formula (2).

(2)

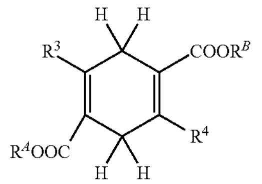

(In the formula (2), $R^A$ and $R^B$each independently represent a monovalent group, $R^3$ represents a hydroxy group or a group expressed by formula (3), and $R^4$ represents a hydroxy group or a group expressed by formula (4).)

(3)

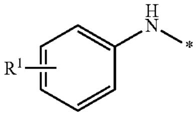

(4)

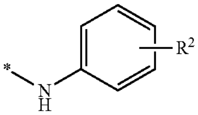

(In the formulas (3) and (4), $R^1$ and $R^2$ each independently represent a monovalent group, * in the formula (3) represents that it is bonded to a carbon atom to which $R^3$ in the formula (2) is bonded, and * in the formula (4) represents that it is bonded to a carbon atom to which $R^4$ in the formula (2) is bonded).

11. An inkjet recording apparatus comprising:

a conveying unit that conveys a recording medium; and a recording head that discharges ink to the recording medium, wherein the ink is the inkjet ink according to claim 1.

12. The inkjet recording apparatus according to claim 11, wherein the recording head is a line head.

* * * * *